(12) United States Patent
Xu et al.

(10) Patent No.: US 11,373,116 B2
(45) Date of Patent: Jun. 28, 2022

(54) MODEL PARAMETER FUSION METHOD AND APPARATUS

(71) Applicant: HUAWEI TECHNOLOGIES CO., LTD., Guangdong (CN)

(72) Inventors: Jun Xu, Hangzhou (CN); Yunfeng Shao, Beijing (CN); Xiao Yang, Beijing (CN); Zheng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 985 days.

(21) Appl. No.: 15/980,496

(22) Filed: May 15, 2018

(65) Prior Publication Data
US 2018/0267927 A1 Sep. 20, 2018

Related U.S. Application Data

(63) Continuation of application No. PCT/CN2015/094746, filed on Nov. 16, 2015.

(51) Int. Cl.
*G06F 16/00* (2019.01)
*G06N 20/00* (2019.01)
(Continued)

(52) U.S. Cl.
CPC ............. *G06N 20/00* (2019.01); *G06F 16/00* (2019.01); *G06K 9/6288* (2013.01); *H04Q 3/5455* (2013.01)

(58) Field of Classification Search
CPC ...... G06N 20/00; H04Q 3/5455; G06F 16/00; G06F 17/18; G06K 9/6288
See application file for complete search history.

(56) References Cited

U.S. PATENT DOCUMENTS 7,321,843 B2 1/2008 Alberto et al.
8,027,938 B1 9/2011 Peng et al.
(Continued)

FOREIGN PATENT DOCUMENTS

CN 101141413 A 3/2008
CN 101282243 A 10/2008
(Continued)

OTHER PUBLICATIONS

Z Yan, U Shao, Asynchronous Distributed Data Parallelism for Machine Learning, 2015, learningsys.org, 1-5. (Year: 2015).*
(Continued)

*Primary Examiner* — Matthew C Bella
*Assistant Examiner* — Kathleen M Broughton
(74) *Attorney, Agent, or Firm* — Leydig, Voit & Mayer, Ltd.

(57) ABSTRACT

Embodiments of the present invention provide a model parameter fusion method and apparatus, which relate to the field of machine learning and intend to reduce a data transmission amount and implement dynamical adjustment of computing resources during model parameter fusion. The method includes: dividing, by an $i^{th}$ node, a model parameter of the $i^{th}$ node into N blocks, where the $i^{th}$ node is any node of N nodes that participate in a fusion, and $1 \le i \le N \le M$; receiving, by the $i^{th}$ node, $i^{th}$ model parameter blocks respectively sent by other nodes of the N nodes than the $i^{th}$ node; fusing, by the $i^{th}$ node, an $i^{th}$ model parameter block of the $i^{th}$ node and the $i^{th}$ model parameter blocks respectively sent by the other nodes, so as to obtain the $i^{th}$ general model parameter block; and distributing, by the $i^{th}$ node, the $i^{th}$ general model parameter block to the other nodes of the N nodes.

15 Claims, 14 Drawing Sheets

(51) Int. Cl.
   *H04Q 3/545* (2006.01)
   *G06K 9/62* (2022.01)

(56) References Cited

U.S. PATENT DOCUMENTS

| | | |
|---|---|---|
| 2012/0016816 A1 | 1/2012 | Toshihiko et al. |
| 2014/0114885 A1 | 4/2014 | Han et al. |
| 2014/0257995 A1 | 9/2014 | Wang |

FOREIGN PATENT DOCUMENTS

| | | | | |
|---|---|---|---|---|
| CN | 101996197 | A | | 3/2011 |
| CN | 102467570 | A | | 5/2012 |
| CN | 102869064 | A | * | 1/2013 |
| CN | 103503463 | A | | 1/2014 |
| CN | 103578092 | A | | 2/2014 |
| CN | 103914528 | A | | 7/2014 |
| CN | 104598600 | A | | 5/2015 |
| CN | 104994172 | A | | 10/2015 |
| CN | 105959987 | A | * | 9/2016 |
| EP | 2785058 | A1 | | 10/2014 |
| WO | WO-2016119429 | A1 | * | 8/2016 ........... G06N 3/0454 |
| WO | WO-2017084016 | A1 | * | 5/2017 ............. G06F 15/16 |

OTHER PUBLICATIONS

Mu Li et al, Scaling Distributed Machine Learning with the Parameter Server. OSDI" 14 Proceedings of the 11th USENIX conference on Operating Systems Design and Implementation, Oct. 6-8, 2014 ,16 pages.

Zheng Yan et al., Asynchronous Distributed Data Parallelism for Machine Learning. 2015, 5 pages.

* cited by examiner

MODEL PARAMETER FUSION METHOD AND APPARATUS

TECHNICAL FIELD

The present invention relates to the field of machine learning, and in particular, to a model parameter fusion method and apparatus.

BACKGROUND

A model parameter refers to a parameter that includes multiple constraint parameters and describes a model. Data having a common feature may be selected by using a model parameter. For example, when the model parameter is an image-type model parameter, image data of a character, an animal, or a human face may be selected from a plenty of image data by using different model parameters. As a data amount and data types rapidly increase, increasing model parameters are used for data selection, and these model parameters are obtained by performing multiple computations and fusions on a large amount of data having a common feature.

Currently, all model parameter fusion is to divide data into multiple data subsets, and the data subsets are allocated to different nodes for training by using a data iterative computation method. After one or more iterative computations, model parameters obtained by all nodes by means of training on different data subsets are fused once, and a model parameter resulting from the fusion is used as an initial model parameter for a next iterative computation. After multiple fusions are performed, a final general model parameter is obtained.

In the prior art, there are mainly two model parameter fusion methods. A first method is that after all the nodes have completed multiple iterative computations on multiple data subsets, a parameter server consolidates and fuses model parameters obtained by training, by all the nodes, on the multiple data subsets, so as to obtain new model parameters; then, all the nodes perform a next iterative computation on the multiple data subsets according to the new model parameters. A second method is that after a node completes multiple iterative computations on a data subset allocated to the node, a model parameter obtained by training, by the node, on the allocated data subset is sent to another specified node, so that the model parameter is fused with a model parameter of a data subset of the another node; then the node starts an iterative computation according to a model parameter that is received by the node and that is transmitted after training, by the another node, on another data subset. However, in the first method, a parameter server configured to perform a model parameter fusion is required to provide relatively high performance, and a system breakdown is very likely to occur; in the second method, a relatively large amount of data needs to be stored, and a large amount of data needs to be transmitted.

SUMMARY

Embodiments of the present invention provide a model parameter fusion method and apparatus, so as to resolve a problem that, during model parameter fusion, a parameter server is required to provide high performance, a large amount of data needs to be transmitted.

To achieve the foregoing objective, the following technical solutions are used in the embodiments of the present invention:

According to a first aspect, a model parameter fusion method is provided, applied to a machine learning system, where the machine learning system includes M nodes and the method includes:

dividing, by an $i^{th}$ node, a model parameter of the $i^{th}$ node into N blocks, where the $i^{th}$ node is any node of N nodes that participate in a fusion and that are of the M nodes, $1 \leq i \leq N \leq M$, and an $i^{th}$ block of the N blocks resulting from the division of the model parameter is an $i^{th}$ model parameter block;

receiving, by the $i^{th}$ node, $i^{th}$ model parameter blocks respectively sent by other nodes of the N nodes than the $i^{th}$ node;

fusing, by the $i^{th}$ node, the $i^{th}$ model parameter block of the $i^{th}$ node and the $i^{th}$ model parameter blocks respectively sent by the other nodes, so as to obtain the $i^{th}$ general model parameter block; and distributing, by the $i^{th}$ node, the $i^{th}$ general model parameter block to the other nodes of the N nodes than the $i^{th}$ node.

When the $i^{th}$ node receives the $i^{th}$ model parameter blocks respectively sent by the other nodes of the N nodes than the $i^{th}$ node, and distributes the $i^{th}$ general model parameter block to the other nodes of the N nodes, a full-duplex data transmission manner may be used, that is, when sending data to another node, the $i^{th}$ node may simultaneously receive data sent by the another node; for example, the $i^{th}$ node uses a full-duplex network interface card. This is not limited in the present invention.

In addition, the N nodes that participate in the fusion are determined from the M nodes according to a preset fusion condition. The fusion condition may be that a quantity of nodes that have completed an iterative computation reaches a preset value, and during each fusion, the preset value may be a constant, or may be variable; or the fusion condition is that a quantity of times that a specified computation is completed reaches a preset quantity of times, and during each fusion, the preset quantity of times may be a constant, or may be variable; or the fusion condition is that an iterative computation has been performed for a preset duration, and during each fusion, the preset duration may be a constant, or may be variable. Certainly, the fusion condition may also be another condition, or the like. This is not limited in detail in the present invention.

Further, if N nodes have completed the fusion, when a fusion controller determines another N nodes, the fusion controller may determine the nodes that have completed the fusion, and N nodes of nodes that have not completed the fusion and have completed the specified computation.

With reference to the first aspect, in a first possible implementation manner of the first aspect, before the dividing, by an $i^{th}$ node, a model parameter of the $i^{th}$ node into N blocks, the method further includes:

sending, by a $k^{th}$ node to a fusion controller, an address and fusion state information of the $k^{th}$ node, where the fusion state information includes a computation state and/or a quantity of iterations of the node, the $k^{th}$ node is a node that has completed a specified iteration task and that is of the M nodes, and $1 \leq k \leq M$; and receiving, by the $i^{th}$ node, fusion indication information sent by the fusion controller, where the fusion indication information is sent by the fusion controller after the N nodes that meet a fusion condition are determined according to the received address and fusion state information of the $k^{th}$ node, the fusion indication information includes addresses and/or numbers of the N nodes, and quantities of N nodes that are determined by the fusion controller at different times and that meet the fusion condition are the same or different.

It should be noted that after the $k^{th}$ node completes a specified computation, the $k^{th}$ node sends the address and currently recorded fusion state information of the $k^{th}$ node to the fusion controller; a fixed node may serve as the fusion controller, and the fusion controller determines, according to the foregoing fusion condition, the N nodes that participate in the fusion.

With reference to the first possible implementation manner of the first aspect, in a second possible implementation manner of the first aspect, if the fusion controller is a first node, where the first node is alternately any node of T nodes of the M nodes, before the sending, by a $k^{th}$ node to a fusion controller, an address and fusion state information of the $k^{th}$ node, the method further includes:

receiving, by the $k^{th}$ node, an address of the first node sent by the first node, which means a node currently serving as the fusion controller sends an address of the node to the $k^{th}$ node; and correspondingly, the sending, by a $k^{th}$ node to a fusion controller, an address and fusion state information of the $k^{th}$ node includes:

sending, by the $k^{th}$ node according to the address of the first node, the address and the fusion state information of the $k^{th}$ node to the first node; that is, when any other node alternately serves as the fusion controller, the $k^{th}$ node sends the address and the fusion state information of the $k^{th}$ node to a node currently used as the fusion controller, where for example, the fusion state information may be a computation state and/or a quantity of iterations of the node.

It should be noted that when the fusion controller is a first node, the first node may be any node of T nodes of the M nodes, and the T nodes of the M nodes may alternately serve as the first node; that is, a current fusion controller may specify any node of the T nodes of the M nodes as a node that serves as next fusion controller, and the node that serves as the next fusion controller may specify a node to serve as an after-next fusion controller, and so on.

With reference to the first aspect, in a third possible implementation manner of the first aspect, before the dividing, by an $i^{th}$ node, a model parameter of the $i^{th}$ node into N blocks, the method further includes:

broadcasting, by a $k^{th}$ node, an address and fusion state information of the $k^{th}$ node to each node of the M nodes, which means that each node of the M nodes may simultaneously record the address and the fusion state information of the $k^{th}$ node; and receiving, by the $k^{th}$ node, fusion indication information sent by a second node, where the second node is any node of K nodes of the M nodes, the fusion indication information is sent by the second node after the N nodes that meet a fusion condition are determined according to the received address and fusion state information of the $k^{th}$ node, and the fusion indication information includes addresses and/or numbers of the N nodes, that is, any node of the nodes that simultaneously record the address and the fusion state information of the $k^{th}$ node is used as the second node, and the second node serves as the fusion controller.

With reference to any one of the first aspect, or the first to the third possible implementation manners of the first aspect, in a fourth possible implementation manner of the first aspect, the method further includes:

sending, by the $i^{th}$ node, a $j^{th}$ model parameter block of the $i^{th}$ node to a $j^{th}$ node of the N nodes, where $1 \leq j \leq N$ and $j \neq i$.

That is, the $i^{th}$ node sends, to the other nodes of the N nodes, other model parameter blocks of the divided model parameter than the $i^{th}$ block; $j^{th}$ blocks having a same number are sent to a $j^{th}$ node, and the $j^{th}$ node is responsible for fusing the $j^{th}$ model parameter blocks.

With reference to the fourth possible implementation manner of the first aspect, in a fifth possible implementation manner of the first aspect, the method further includes:

receiving, by the $i^{th}$ node, the $j^{th}$ general model parameter block that results from a fusion by the $i^{th}$ node and that is sent by the $i^{th}$ node;

consolidating, by the $i^{th}$ node, corresponding parts of all received general model parameters that result from fusions by the other nodes of the N nodes than the $i^{th}$ node and that are sent by the other nodes, so as to generate a new general model parameter of the $i^{th}$ node; and performing, by the $i^{th}$ node, an iterative computation according to the new general model parameter.

According to a second aspect, a model parameter fusion method is provided, applied to a machine learning system, where the machine learning system includes M nodes and the method includes:

receiving, by a fusion controller, an address and fusion state information sent by a node that has completed a specified computation and that is of the M nodes, where the fusion state information includes a computation state and/or a quantity of iterations of the node;

determining, by the fusion controller according to the received address and fusion state information, N nodes that meet a fusion condition, where quantities of N nodes that are determined by the fusion controller at different times and that meet the fusion condition are the same or different; and sending, by the fusion controller, fusion indication information to each node of the N nodes, where the fusion indication information includes addresses and/or numbers of the N nodes, so that each node of the N nodes divides a model parameter of the node into N blocks; sending an $i^{th}$ model parameter block resulting from the division of the model parameter of the node to an $i^{th}$ node, where $1 \leq i \leq N$; fusing, by each node of the N nodes, each received model parameter; and distributing, by each node of the N nodes, a model parameter resulting from the fusion to other nodes of the N nodes than the node.

With reference to the second aspect, in a first possible implementation manner of the second aspect, the fusion condition is that a quantity of nodes that have completed the specified computation reaches a preset value, or that a quantity of times that the specified computation is completed reaches a preset quantity of times, or that a preset duration has expired.

It should be noted that the preset value, the preset quantity of times, and the preset duration may be set in advance; and the preset value, the preset quantity of times, and the preset duration may be constants, or may be variable. This is not limited in the present invention.

In addition, when the fusion controller determines the N nodes that meet the fusion condition, the fusion controller may determine nodes that have completed a fusion, and N nodes of nodes that have not completed the fusion and have completed the specified computation.

With reference to the second aspect or the first possible implementation manner of the second aspect, in a second possible implementation manner of the second aspect, the fusion controller is a first node, where the first node is any node of K nodes of the M nodes; and before the receiving, by a fusion controller, an address and fusion state information sent by a node that has completed a specified computation and that is of the M nodes, the method further includes:

sending, by the first node that is used as a fusion controller in a first time period, an address of the first node to other nodes of the M nodes than the first node.

It should be noted that when the first node is used as the fusion controller in the first time period, the first node may be any node of the K nodes of the M nodes, and the first node may be specified in advance.

With reference to the second possible implementation manner of the second aspect, in a third possible implementation manner of the second aspect, the method further includes:

after a preset condition is met, determining, by the first node, a second node as a fusion controller in a second time period, where the second node is any node of the K nodes of the M nodes, and K≤M;

sending, by the first node, node fusion information to the second node, where the node fusion information includes addresses and fusion state information of the M nodes; and sending, by the first node, an address of the second node to other nodes than the second node.

The preset condition may be that a specific time passes, or a specific quantity of fusions passes, or a specific quantity of iterations passes, or the like. This is not limited in the present invention.

It should be noted that the specific time, the specific quantity of fusions, and the specific quantity of iterations may be set in advance; and the specific time, the specific quantity of fusions, and the specific quantity of iterations may be constant, or may be variable.

Specifically, after a preset condition is met, the first node that serves as the fusion controller in the first time period specifies a node to serve as a fusion controller in a second time period, and the node is referred to as a second node, that is, the second node replaces the first node to serve as the fusion controller; and the first node sends node fusion information of the M nodes to the second node, and the second node sends an address of the second node to other nodes, so that the other nodes report addresses and fusion state information after completing the fusion.

Further, if the second node is faulty in the second time period, the first node determines a third node as the parameter fusion controller in the second time period, where the third node is any node of the K nodes of the M nodes.

That is, when the second node is faulty and cannot be used as the fusion controller, the first node that serves as a previous fusion controller redetermines a node of the M nodes as the fusion controller in the second time period, and the redetermined node may be referred to as the third node.

With reference to the second aspect or the first possible implementation manner of the second aspect, in a fourth possible implementation manner of the second aspect, the fusion controller is at least one node of the M nodes, the at least one node receives an address and fusion state information sent by each node after the node completes the specified computation; and that the fusion controller determines, according to the received address and fusion state information, the N nodes that meet the fusion condition, and sends the fusion indication information to each node of the N nodes is: determining, by any node of the at least one node according to the received address and fusion state information, the N nodes that meet the fusion condition, and sending the fusion indication information to each node of the N nodes.

That is, when one or more nodes of the M nodes all record node fusion information of the M nodes, after completing the fusion, each node sends an address and fusion state information of the node, for example, a computation state and/or a quantity of iterations of the node, to at least one node that records the node fusion information and that is of the M nodes; and any node of the at least one node determines, according to the received address and fusion state information, the N nodes that meet the fusion condition, and sends the fusion indication information to each node of the N nodes.

According to a third aspect, a model parameter fusion apparatus is provided, applied to a machine learning system, where the machine learning system includes M nodes and the apparatus includes:

a division unit, configured to divide a model parameter of the model parameter fusion apparatus into N blocks, where N is a quantity of model parameter fusion apparatuses that participate in a fusion and that are of the M model parameter fusion apparatuses, an $i^{th}$ block of the N blocks resulting from the division of the model parameter is an $i^{th}$ model parameter block, and $1 \le i \le N \le M$;

a first receiving unit, configured to receive $i^{th}$ model parameter blocks respectively sent by other model parameter fusion apparatuses of the N model parameter fusion apparatuses than the model parameter fusion apparatus;

a fusion unit, configured to fuse the $i^{th}$ model parameter block of the model parameter fusion apparatus and the $i^{th}$ model parameter blocks respectively sent by the other model parameter fusion apparatuses, so as to obtain the $i^{th}$ general model parameter block; and a first sending unit, configured to distribute the $i^{th}$ general model parameter block to the other model parameter fusion apparatuses of the N model parameter fusion apparatuses than the model parameter fusion apparatus.

When the $i^{th}$ model parameter blocks respectively sent by the other model parameter fusion apparatuses of the N model parameter fusion apparatuses than the model parameter fusion apparatus are received, and the $i^{th}$ general model parameter block is distributed to the other model parameter fusion apparatuses of the N model parameter fusion apparatuses, a full-duplex data transmission manner may be used, that is, when data is sent to another model parameter fusion apparatus, data sent by the another model parameter fusion apparatus may be simultaneously received; for example, a full-duplex network interface card is used. This is not limited in the embodiments of the present invention.

In addition, the N model parameter fusion apparatuses that participate in the fusion are determined from the M model parameter fusion apparatuses according to a preset fusion condition. The fusion condition may be that a quantity of nodes that have completed an iterative computation reaches a preset value, and during each fusion, the preset value may be a constant, or may be variable; or the fusion condition is that a quantity of times that a specified computation is completed reaches a preset quantity of times, and during each fusion, the preset quantity of times may be a constant, or may be variable; or the fusion condition is that an iterative computation has been performed for a preset duration, and during each fusion, the preset duration may be a constant, or may be variable. Certainly, the fusion condition may also be another condition, or the like. This is not limited in detail in the embodiments of the present invention.

With reference to the third aspect, in a first possible implementation manner of the third aspect, the apparatus further includes:

a second sending unit, configured to: after a specified iteration task is completed, send an address and fusion state information of the model parameter fusion apparatus to a fusion controller, where the fusion state information includes a computation state and/or a quantity of iterations of the model parameter fusion apparatus; and a second receiving unit, configured to receive fusion indication information, where the fusion indication information is sent by the fusion controller after the N model parameter fusion apparatuses that meet a fusion condition are determined according to received addresses and fusion state information of K model parameter fusion apparatuses, the fusion indication information includes addresses and/or numbers of the N model parameter fusion apparatuses, the K model parameter fusion apparatuses are model parameter fusion apparatuses that have completed the specified iteration task and that are of the M model parameter fusion apparatuses, and $1 \leq K \leq M$.

With reference to the third aspect, in a second possible implementation manner of the third aspect, the fusion controller is a first model parameter fusion apparatus, the first model parameter fusion apparatus is alternately any model parameter fusion apparatus of T model parameter fusion apparatuses of the M nodes, and the $T \leq M$, the apparatus further includes:

a third receiving unit, configured to receive an address of the first model parameter fusion apparatus sent by the first model parameter fusion apparatus; and correspondingly, the second sending unit is specifically configured to:

send the address and the fusion state information of the model parameter fusion apparatus to the first model parameter fusion apparatus according to the address of the first model parameter fusion apparatus.

It should be noted that when the model parameter fusion apparatus is a first model parameter fusion apparatus, the first model parameter fusion apparatus may be any model parameter fusion apparatus of the K model parameter fusion apparatuses of the M model parameter fusion apparatuses, and the K model parameter fusion apparatuses of the M model parameter fusion apparatuses may alternately serve as the first model parameter fusion apparatus; that is, the first model parameter fusion apparatus may specify any model parameter fusion apparatus of the K model parameter fusion apparatuses of the M model parameter fusion apparatuses to serve as next model parameter fusion apparatus, and the next model parameter fusion apparatus may specify an after-next model parameter fusion apparatus, and so on.

With reference to the third aspect, in a third possible implementation manner of the third aspect, the apparatus further includes:

a broadcast unit, configured to broadcast the address and the fusion state information of the model parameter fusion apparatus to each model parameter fusion apparatus of the M model parameter fusion apparatuses, which means that each model parameter fusion apparatus of the M model parameter fusion apparatuses may simultaneously record an address and fusion state information; and a fourth receiving unit, configured to receive fusion indication information sent by a second model parameter fusion apparatus, where the second model parameter fusion apparatus is any model parameter fusion apparatus of K model parameter fusion apparatuses of the M model parameter fusion apparatuses, the fusion indication information is sent by the second model parameter fusion apparatus after the N model parameter fusion apparatuses that meet a fusion condition are determined according to received addresses and fusion state information of the K model parameter fusion apparatuses, the fusion indication information includes addresses and/or numbers of the N nodes, the K model parameter fusion apparatuses are model parameter fusion apparatuses that have completed a specified iteration task and that are of the M model parameter fusion apparatuses, and $1 \leq K \leq M$.

That is, any model parameter fusion apparatus of nodes that simultaneously record addresses and fusion state information of the M model parameter fusion apparatuses is used as a second model parameter fusion apparatus, and the second model parameter fusion apparatus serves as next model parameter fusion apparatus.

With reference to the third aspect, in a fourth possible implementation manner of the third aspect, the apparatus further includes:

a fifth receiving unit, configured to receive addresses and fusion state information of K model parameter fusion apparatuses, where the fusion state information includes a computation state and/or a quantity of iterations of a model parameter fusion apparatus, the K model parameter fusion apparatuses are model parameter fusion apparatuses that have completed a specified iteration task and that are of the M model parameter fusion apparatuses, and $1 \leq K \leq M$;

a determining unit, configured to determine, according to the received addresses and fusion state information of the K model parameter fusion apparatuses, the N model parameter fusion apparatuses that meet a fusion condition; and a third sending unit, configured to send fusion indication information to the other model parameter fusion apparatuses of the N model parameter fusion apparatuses than the model parameter fusion apparatus, so that the other model parameter fusion apparatuses of the N model parameter fusion apparatuses than the model parameter fusion apparatus perform a parameter fusion according to the fusion indication information, where the fusion indication information includes addresses and/or numbers of the N nodes.

With reference to the third possible implementation manner of the third aspect, in a fifth possible implementation manner of the third aspect, the apparatus further includes:

a fourth sending unit, configured to send an address of the model parameter fusion apparatus to other model parameter fusion apparatuses of the M model parameter fusion apparatuses than the model parameter fusion apparatus, so that the other model parameter fusion apparatuses of the M model parameter fusion apparatuses than the model parameter fusion apparatus send, according to the received address, addresses and fusion state information of the other model parameter fusion apparatuses.

With reference to any one of the third aspect, or the first to the sixth possible implementation manners of the third aspect, in a seventh possible implementation manner of the third aspect, the apparatus further includes:

a fifth sending unit, configured to send a $j^{th}$ model parameter block of the model parameter fusion apparatus to a $j^{th}$ model parameter fusion apparatus of the N model parameter fusion apparatuses, where $1 \leq J \leq N$ and $j \neq i$.

That is, other model parameter blocks of the divided model parameter than the $i^{th}$ block are sent to the other model parameter fusion apparatuses of the N model parameter fusion apparatuses; $j^{th}$ blocks having a same number are sent to the $j^{th}$ model parameter fusion apparatus, and the $j^{th}$ model parameter fusion apparatus is responsible for fusing the $j^{th}$ model parameter blocks.

With reference to the seventh possible implementation manner of the third aspect, in a fifth possible implementation manner of the third aspect, the apparatus further includes:

a sixth receiving unit, configured to receive the $j^{th}$ general model parameter block that results from a fusion by the $j^{th}$ model parameter fusion apparatus and that is sent by the $j^{th}$ model parameter fusion apparatus;

a consolidation unit, configured to receive the $j^{th}$ general model parameter block that results from a fusion by the $j^{th}$ model parameter fusion apparatus and that is sent by the $j^{th}$ model parameter fusion apparatus; and a computation unit, configured to perform an iterative computation according to the new general model parameter.

According to a fourth aspect, a model parameter fusion apparatus is provided, applied to a machine learning system, where the machine learning system includes M nodes and the apparatus includes:

a receiving unit, configured to receive an address and fusion state information sent by a node that has completed a specified computation and that is of the M nodes, where the fusion state information includes a computation state and/or a quantity of iterations of the node;

a first determining unit, configured to determine, according to the received address and fusion state information, N nodes that meet a fusion condition, where quantities of N nodes that are determined by a fusion controller at different times and that meet the fusion condition are the same or different; and a first sending unit, configured to: send fusion indication information to each node of the N nodes, where the fusion indication information includes addresses and/or numbers of the N nodes, so that each node of the N nodes divides a model parameter of the node into N blocks; and send an $i^{th}$ model parameter block resulting from the division of the model parameter of the node to an $i^{th}$ node, where $1 \leq i \leq N$, each node of the N nodes fuses model parameters received by the node, and each node of the N nodes distributes a model parameter resulting from the fusion to other nodes of the N nodes than the node.

With reference to the fourth aspect, in a first possible implementation manner of the fourth aspect, the fusion condition is that a quantity of nodes that have completed the specified computation reaches a preset value, or that a quantity of times that the specified computation is completed reaches a preset quantity of times, or that a preset duration has expired.

Optionally, the first determining unit is further specifically configured to:

determine nodes that have completed a fusion, and N nodes of nodes that have not completed the fusion and have completed the specified computation.

With reference to the fourth aspect or the first possible implementation manner of the fourth aspect, in a second possible implementation manner of the fourth aspect, the model parameter fusion apparatus is a first node, where the first node is any node of the M nodes, and the apparatus further includes:

a second sending unit, configured to send an address of the first node to other nodes of the M nodes than the first node.

With reference to the second possible implementation manner of the fourth aspect, in a third possible implementation manner of the fourth aspect, the apparatus further includes:

a second determining unit, configured to: after a preset condition is met, determine a second node as a model parameter fusion apparatus in a second time period, where the second node is any node of K nodes of the M nodes, and $K \leq M$;

a third sending unit, configured to send node fusion information to the second node, where the node fusion information includes addresses and fusion state information of the M nodes; and a fourth sending unit, configured to send an address of the second node to other nodes than the second node.

The preset condition may be that a specific time passes, or a specific quantity of fusions passes, or a specific quantity of iterations passes, or the like. This is not limited in the present invention.

It should be noted that the specific time, the specific quantity of fusions, and the specific quantity of iterations may be set in advance; and the specific time, the specific quantity of fusions, and the specific quantity of iterations may be constant, or may be variable.

With reference to the fourth possible implementation manner of the fourth aspect, in a fifth possible implementation manner of the fourth aspect, the apparatus further includes:

a third determining unit, configured to: if the second node is faulty in the second time period, determine a third node as the model parameter fusion apparatus in the second time period, where the third node is any node of the K nodes of the M nodes.

That is, when the second node is faulty, the third determining unit redetermines a node of the M nodes as the model parameter fusion apparatus in the second time period; in this case, the node may be referred to as a third node.

With reference to the fourth aspect or the first possible implementation manner of the fourth aspect, in a fourth possible implementation manner of the fourth aspect, the model parameter fusion apparatus is at least one node of the M nodes; and that the at least one node receives an address and fusion state information sent by each node after the node completes the specified computation, determines the N nodes that meet the fusion condition, and sends the fusion indication information to each node of the N nodes is: determining, by any node of the at least one node according to the received address and fusion state information, the N nodes that meet the fusion condition, and sending the fusion indication information to each node of the N nodes.

That is, when one or more nodes of the M nodes all record node fusion information of the M nodes, after completing the fusion, each node sends an address and fusion state information of the node, for example, a computation state and/or a quantity of iterations of the node, to at least one node that records the node fusion information and that is of the M nodes. Any node of the at least one node determines, according to the received address and fusion state information, the N nodes that meet the fusion condition, and sends the fusion indication information to each node of the N nodes.

According to a fifth aspect, a node is provided, where the node includes a processor and a memory, the memory stores code and data, the processor may run the code in the memory, and the processor is configured to execute the foregoing model parameter fusion method according to any one of the first aspect, or the first to the fifth possible implementation manners of the first aspect.

According to a sixth aspect, a fusion controller is provided, where the fusion controller includes a processor and a memory, the memory stores code and data, the processor may run the code in the memory, and the processor is configured to execute the model parameter fusion method according to any one of the second aspect, or the first to the fourth possible implementation manners of the second aspect.

According to a seventh aspect, a machine learning system is provided, where the machine learning system includes the node according to the fifth aspect, and the fusion controller according to the sixth aspect.

With reference to the seventh aspect, in a first possible implementation manner of the seventh aspect, the fusion controller is provided separate from the node, or is configured on the node.

According to the model parameter method and apparatus provided in the embodiments of the present invention, N nodes that meet a fusion condition are determined; a model parameter of an $i^{th}$ node is divided into N blocks; $i^{th}$ model parameter blocks respectively sent by other nodes of the N nodes than the $i^{th}$ node are received; then, an $i^{th}$ model parameter block of the $i^{th}$ node and the $i^{th}$ model parameter blocks respectively sent by the other nodes are fused, so as to obtain the $i^{th}$ general model parameter block; and finally, the $i^{th}$ general model parameter block is distributed to the other nodes of the N nodes, where the $i^{th}$ node is any node of the N nodes that participate in a fusion. Therefore, computing resources can be dynamically adjusted, capabilities of dynamically deleting and adding a node are provided, and in addition, each node that participates in the fusion may simultaneously send a model parameter and receive a model parameter, which improves network resource utilization and system stability.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
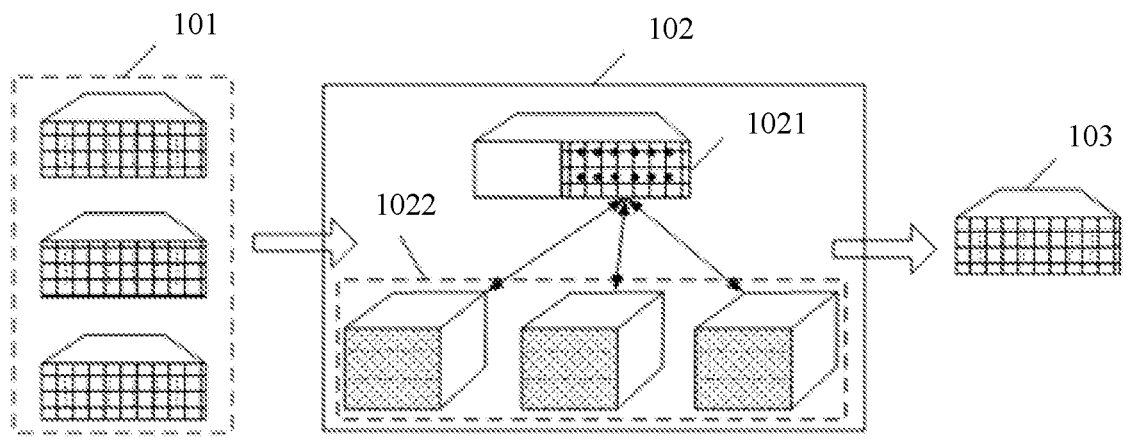
FIG. 1 is a schematic structural diagram of a machine learning system according to an embodiment of the present invention.

A machine learning system architecture applied in an embodiment of the present invention is shown in FIG. 1. The system architecture includes a data storage device 101, a model parameter training platform 102, and a model parameter storage device 103.

The data storage device 101 may be a data storage server 101, and the data storage server 101 may be configured to store source data used for model parameter training. A storage capacity of the data storage server 101 is far greater than a storage capacity of a computation server 1021 on the model training platform 102. The source data may be language data, image data, video data, or the like. The source data includes multiple data sets, each data set further includes multiple type subsets, and each type subset has a data tag used to indicate a category. Tags of type subsets included in a same data set are the same; for example, the data set may include multiple character images having a character tag, or may include multiple animal images having an animal tag, or another category of images.

The model parameter training platform 102 includes: the computation server 1021 configured to perform an iterative computation, where the computation server 1021 may also be referred to as a node, which may be specifically a common computer, a mobile terminal, a workstation, a general-purpose server, a special-purpose server, or the like; and a switch 1022 configured to be responsible for data communication between computation servers. The computation server 1021 has a local storage device, and a capacity of the storage device is less than that of the data storage server 101. During model training, each computation server reads, in a sampling manner, specific data from the data storage server 101 to a local storage device for model parameter training. The model parameter training platform 102 may obtain, by performing model parameter training and a model parameter training fusion on a data set having a data tag, a finally outputted general model parameter obtained by means of fusion; and a data type of new data may be identified according to the general model parameter. For example, when an image data set having a character tag is used to perform a model parameter fusion, a character image in new image data may be identified according to a finally outputted model parameter; when an image data set having an animal tag is used to perform a model parameter fusion, an animal image in new image data may be identified according to a finally outputted model parameter.

The model parameter storage server 103 is configured to store a model parameter obtained by means of training. When completing the training and fusion, the model parameter training platform 102 may send a final model parameter obtained by means of fusion to the model parameter storage server 103, so that the model parameter is stored in the model parameter storage server 103 for later use. In addition, a model parameter that is initially used by the computation server 1021 in the model parameter training platform 102 to perform the model parameter training and the model parameter fusion may also be obtained from the model parameter storage server 103.

Embodiment 2

Figure 2:
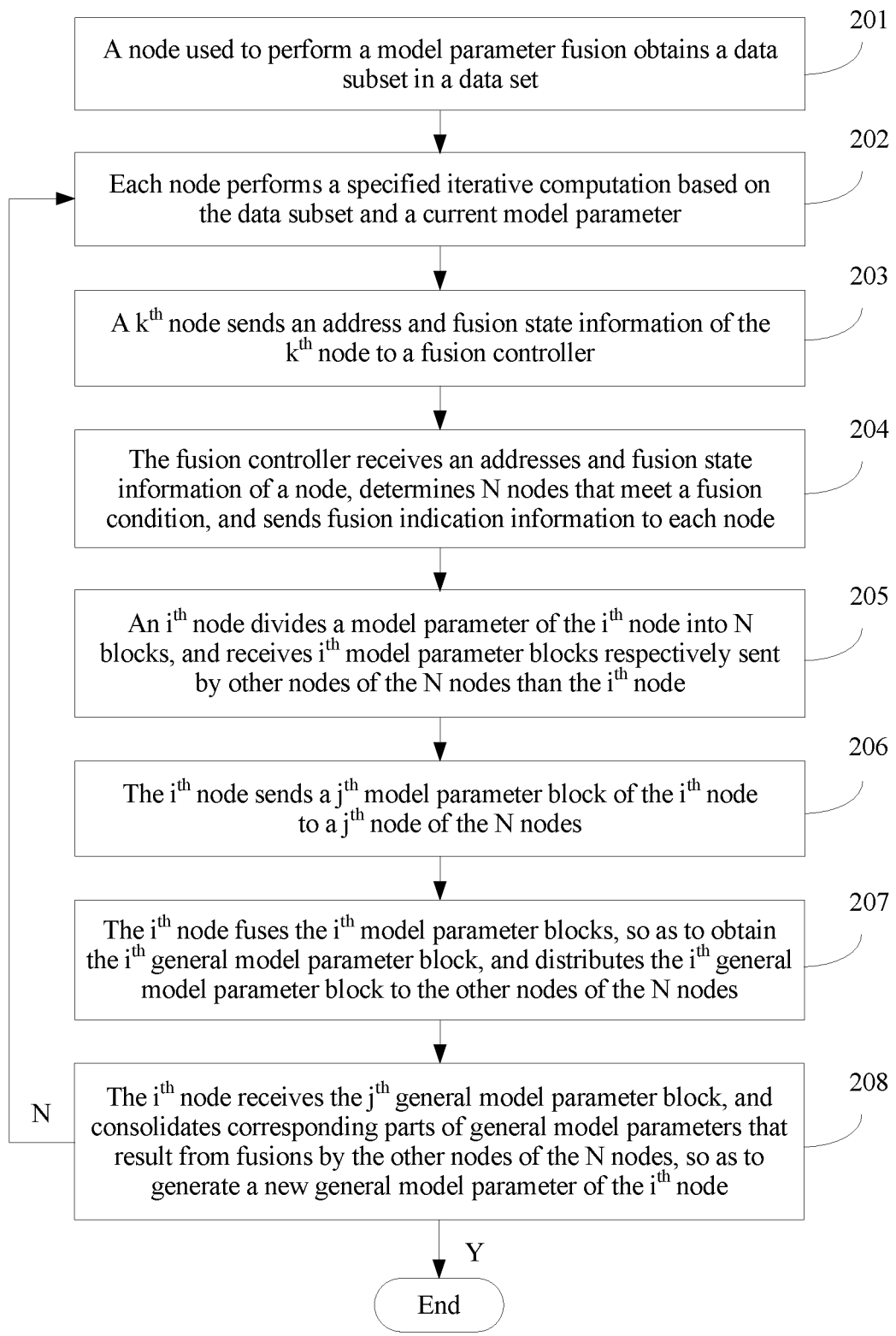
FIG. 2 is a flowchart of a model parameter fusion method according to an embodiment of the present invention.

FIG. 2 is a flowchart of a model parameter fusion method according to an embodiment of the present invention. The method is applied to a machine learning system, where the machine learning system includes M nodes. The method includes the following steps:

Step 201: A node used to perform a model parameter fusion obtains a data subset in a data set.

The data set refers to a data set used to perform a model parameter iterative computation. The data set may be language data, image data, video data, or the like. The data set includes multiple type subsets, and each type subset has a data tag used to indicate a category. Tags of type subsets included in a same data set are the same.

In addition, the data set may be stored in advance in a storage device such as a hard disk or a disk, or may be stored in advance in a data storage server. When the node obtains a data subset from the data set, the storage device may, for example, be directly connected to a device in which the node is located to obtain the data subset, or may obtain data from the data storage server.

It should be noted that a data set for performing the model parameter fusion is far greater than an amount of data used by an actual model parameter; therefore, when the node obtains a data subset in the data set, the node may extract a specific amount of data from the data set; if a computation capability of each node is known in advance, an amount of data of a data subset to be obtained by the node may be allocated according to the computation capability of the node.

Step 202: Each node performs a specified iterative computation based on the data subset and a current model parameter.

When performing the model parameter iterative computation for the first time, each node may perform the iterative computation based on an obtained data subset and an initial model parameter; when completing the iterative computation, each node may perform next iterative computation based on the data subset and a currently obtained model parameter.

The initial model parameter indicates an initialized model parameter of each node, and initial model parameters of all nodes may be the same. The currently obtained model parameter indicates a model parameter obtained by performing a current iterative computation by each node, or a currently received model parameter, that is, a currently newest model parameter.

Step 203: A $k^{th}$ node sends an address and fusion state information of the $k^{th}$ node to a fusion controller, where the fusion state information includes a computation state and/or a quantity of iterations of the node, the $k^{th}$ node is a node that has completed a specified iteration task and that is of M nodes, and $1 \leq k \leq M$.

The M nodes included in the machine learning system separately perform the specified iterative computation based on an obtained data subset and model parameter. When any node of the M nodes completes the specified computation, the node sends an address and fusion state information of the node to the fusion controller.

The fusion state information includes a computation state and/or a quantity of iterations of the node, that is, when sending the fusion state information to the fusion controller, the $k^{th}$ node may send a current computation state, or send a current quantity of completed iterations, or send both the current computation state and the current quantity of iterations to the fusion controller. The computation state herein indicates whether the specified iterative computation is completed.

In addition, the address of the $k^{th}$ node may be an IP address of the node, a MAC (Media Access Control, Media Access Control, which is also referred to as a physical address) address, a number of the node, or the like. This is not limited in this embodiment of the present invention.

Step 204: The fusion controller receives an address and fusion state information of a node that has completed the specified computation and that is of the M nodes, determines N nodes that meet a fusion condition, and sends fusion indication information to each node of the N nodes, where the fusion indication information is sent by the fusion controller after the N nodes that meet the fusion condition are determined according to the received address and fusion state information of the $k^{th}$ node, and the fusion indication information includes addresses and/or numbers of the N nodes.

Quantities of N nodes that are determined by the fusion controller at different times and that meet the fusion condition are the same or different. In addition, the fusion indication information includes the addresses and/or the numbers of the N nodes.

It should be noted that N nodes that participate in a fusion are determined from the M nodes according to a preset fusion condition. The fusion condition may be that a quantity of nodes that have completed an iterative computation reaches a preset value, and during each fusion, the preset value may be a constant, or may be variable; or the fusion condition is that a quantity of times that the specified computation is completed reaches a preset quantity of times, and during each fusion, the preset quantity of times may be a constant, or may be variable; or the fusion condition is that an iterative computation has been performed for a preset duration, and during each fusion, the preset duration may be a constant, or may be variable. Certainly, the fusion condition may also be another condition, or the like. This is not limited in detail in the present invention.

In addition, if N nodes have completed the fusion, when the fusion controller determines another N nodes, the fusion controller may determine the nodes that have completed the fusion, and N nodes of nodes that have not completed the fusion and have completed the specified computation.

Further, a fixed node may serve as the fusion controller, or different nodes may alternately serve as the fusion controller, or at least one node may serve as the fusion controller in a distributed manner. Specifically, the three different types of fusion controllers are described below.

A first type: A fixed node serves as the fusion controller. The fixed node may be set in advance, and after completing the specified computation, any node of the M nodes may send an address and fusion state information of the node to the fixed fusion controller; the fixed fusion controller determines, based on the received address and fusion state information, N nodes that meet the fusion condition, and sends fusion indication information to each node of the N nodes.

A second type: Different nodes alternately serve as the fusion controller. A node that first serves as the fusion controller may be referred to as a first node, and the first node is any node of T nodes of the M nodes, where T≤M.

Different nodes alternately serve as the fusion controller. To enable the M nodes to send addresses and fusion state information to the current fusion controller after completing the specified computation, before a $k^{th}$ node sends an address and fusion state information of the $k^{th}$ node to a fusion controller in step 203, the $k^{th}$ node receives an address of the first node sent by the first node, that is, a node that currently serves as the fusion controller sends an address of the node to the M nodes.

Correspondingly, that a $k^{th}$ node sends an address and fusion state information of the $k^{th}$ node to a fusion controller includes: sending, by the $k^{th}$ node according to the address of the first node, the address and the fusion state information of the $k^{th}$ node to the first node.

Then, the first node, which is used as a fusion controller in a first time period, receives an address and fusion state information sent by a node that has completed the specified iterative computation; the first node determines, based on the received address and fusion state information, N nodes that meet the fusion condition, and sends fusion indication information to each node of the N nodes.

After a preset condition is met, the first node determines a second node as a fusion controller in a second time period, where the second node is any node of K nodes of the M nodes. The first node sends node fusion information to the second node, where the node fusion information includes the addresses and the fusion state information of the M nodes. The first node sends an address of the second node to other nodes than the second node.

That is, after meeting the preset condition, the first node may specify any node of the K nodes of the M nodes as a node that serves as next fusion controller, and the specified node is used as the second node and serves as the fusion controller in the second time period. In addition, the first node sends node fusion information of the M nodes to the next fusion controller, and sends an address of the next fusion controller to other nodes. Likewise, the node that serves as the next fusion controller may specify a node to serve as an after-next fusion controller, and so on.

If the second node is faulty in the second time period, the first node may determine a third node as the parameter fusion controller in the second time period, where the third node is any node of the K nodes of the M nodes.

That is, when the second node is faulty and cannot be used as the fusion controller, the first node that serves as a previous fusion controller redetermines any node of the K nodes of the M nodes as the fusion controller in the second time period, and the redetermined node may be referred to as the third node.

It should be noted that the preset condition may be that a specific time passes, or a specific quantity of fusions passes, or a specific quantity of iterations passes, or the like. This is not limited in this embodiment of the present invention.

In addition, the specific time, the specific quantity of fusions, and the specific quantity of iterations may be set in advance, and time lengths, and quantities of fusions, and quantities of iterations that are set at different times may be constant, or may be variable. This is not limited in this embodiment of the present invention.

A third type: At least one node serves as the fusion controller in a distributed manner, and the at least one node may be all or some of the M nodes.

When any node of the M nodes completes the specified computation, the $k^{th}$ node broadcasts the address and the fusion state information of the $k^{th}$ node to each node of the M nodes, and at least one node of the M nodes receives the address and the fusion state information sent by the $k^{th}$ node after the $k^{th}$ node completes the specified computation. The $k^{th}$ node is any node that has completed the specified computation and that is of the M nodes.

That is, when one or more nodes of the M nodes all record node fusion information of the M nodes, after completing the fusion, each node sends an address and fusion state information of the node, for example, a computation state and/or a quantity of iterations of the node, to at least one node that records the node fusion information and that is of the M nodes.

Then, any node of the at least one node determines, according to the received address and fusion state information of the $k^{th}$ node, N nodes that meet the fusion condition, and sends fusion indication information to each node of the N nodes. Each node receives the fusion indication information sent by any node of the at least one node, where the fusion indication information is sent after the N nodes that meet the fusion condition are determined, and the fusion indication information includes addresses and/or numbers of the N nodes.

It should be noted that a number of a node is used to uniquely indicate the node, and the number of the node may be a sequence number randomly allocated to the node, or may be any value randomly allocated to the node, or the like. This is not limited in this embodiment of the present invention.

Step 205: When receiving the fusion indication information, an $i^{th}$ node divides a model parameter of the $i^{th}$ node into N blocks, and receives $i^{th}$ model parameter blocks respectively sent by other nodes of the N nodes than the $i^{th}$ node, where the $i^{th}$ node is any node of the N nodes that participate in a fusion and that are of the M nodes, 1≤i≤N≤M, and an $i^{th}$ block of the N blocks resulting from the division of the model parameter is an $i^{th}$ model parameter block. The $i^{th}$ model parameter block herein refers to a model parameter block that corresponds to the $i^{th}$ node and that is of the N model parameter blocks resulting from the division, and the $i^{th}$ node is responsible for performing a subsequent fusion operation on the $i^{th}$ model parameter block.

Figure 3:
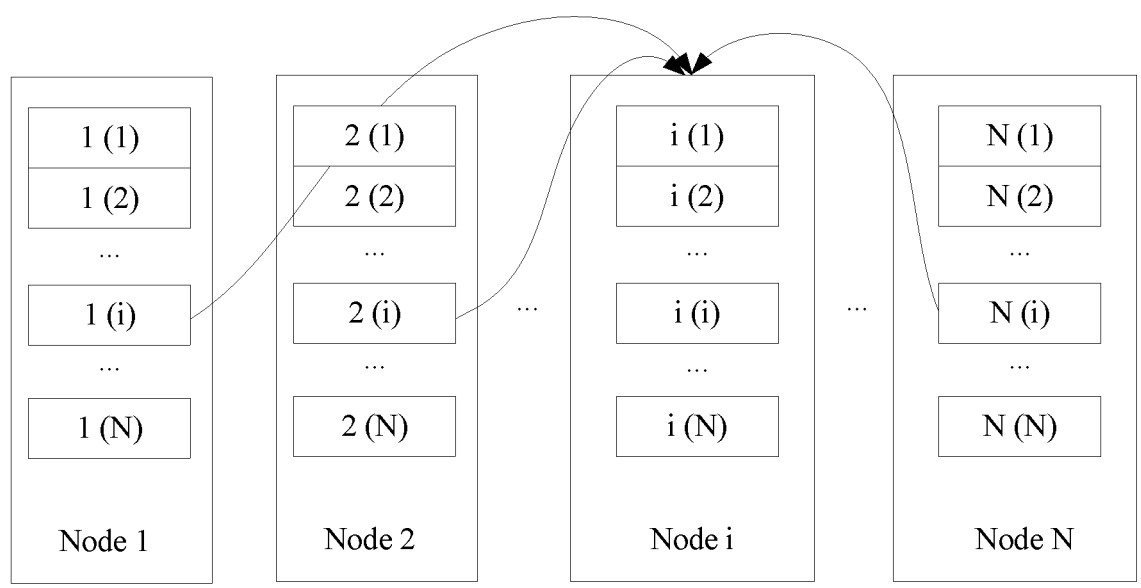
FIG. 3 is a schematic diagram of receiving, by an $i^{th}$ node, an $i^{th}$ model parameter block according to an embodiment of the present invention.

For example, as shown in FIG. 3, the $i^{th}$ node of the N nodes that participate in the fusion divides the model parameter of the $i^{th}$ node into the N blocks, where each model parameter block corresponds to a node, a corresponding node performs a subsequent model parameter fusion operation, the $i^{th}$ model parameter block corresponds to the $i^{th}$ node, and the $i^{th}$ node is responsible for performing the subsequent fusion operation; and receives $i^{th}$ model parameter blocks respectively sent by the other nodes of the N nodes than the $i^{th}$ node.

When the $i^{th}$ node receives the $i^{th}$ model parameter blocks respectively sent by the other nodes of the N nodes than the $i^{th}$ node, and distributes the $i^{th}$ general model parameter block to the other nodes of the N nodes, a full-duplex data transmission manner may be used, that is, when sending data to another node, the $i^{th}$ node may simultaneously receive data sent by the another node; for example, the $i^{th}$ node uses a full-duplex network interface card. This is not limited in the present invention.

Step 206: The $i^{th}$ node sends a $j^{th}$ model parameter block of the $i^{th}$ node to a $j^{th}$ node of the N nodes, where $1 \leq j \leq N$ and $j \neq i$.

That is, the $i^{th}$ node sends, to the other nodes of the N nodes, other model parameter blocks of the divided model parameter than the $i^{th}$ block; that is, the $j^{th}$ model parameter blocks are sent to the $j^{th}$ node, and the $j^{th}$ node is responsible for fusing the $j^{th}$ model parameter blocks. The $j^{th}$ model parameter block herein is a model parameter that corresponds to the $j^{th}$ node and that is of the N model parameter blocks resulting from the division, and the $j^{th}$ node is responsible for performing a subsequent fusion operation.

Step 207: The $i^{th}$ node fuses the $i^{th}$ model parameter block of the $i^{th}$ node and the $i^{th}$ model parameter blocks respectively sent by the other nodes, so as to obtain the $i^{th}$ general model parameter block, and distributes the $i^{th}$ general model parameter block to the other nodes of the N nodes.

Figure 4:
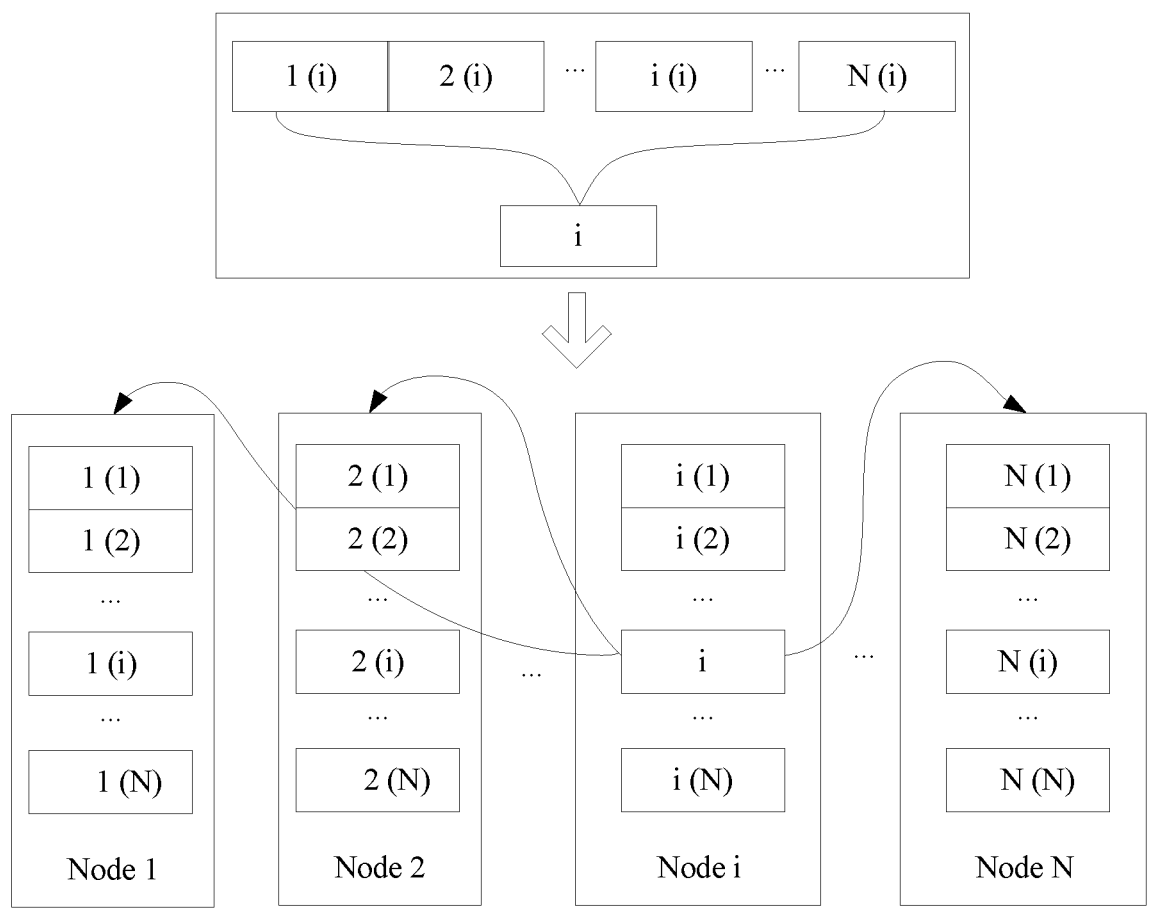
FIG. 4 is a schematic diagram showing that an $i^{th}$ node performs a fusion to obtain and sends the $i^{th}$ general model parameter block according to an embodiment of the present invention.

For example, as shown in FIG. 4, the $i^{th}$ node fuses the $i^{th}$ model parameter block of the $i^{th}$ node and the $i^{th}$ model parameter blocks respectively sent by the other nodes, so as to obtain the $i^{th}$ general model parameter block, and distributes the $i^{th}$ general model parameter block to the other nodes of the N nodes.

Step 208: The $i^{th}$ node receives the $j^{th}$ general model parameter block that results from a fusion by the $j^{th}$ node and that is sent by the $j^{th}$ node, and consolidates corresponding parts of all received general model parameters that result from fusions by the other nodes of the N nodes than the $i^{th}$ node and that are sent by the other nodes, so as to generate a new general model parameter of the $i^{th}$ node.

When the $j^{th}$ node of the N nodes that participate in the fusion obtains by means of fusion, the $j^{th}$ general model parameter block, the $j^{th}$ node sends the $j^{th}$ general model parameter block to the $i^{th}$ node, and the $i^{th}$ node receives the $j^{th}$ general model parameter block fused by the $j^{th}$ node, where $1 \leq j \leq N$ and $j \neq i$.

Then, the $i^{th}$ node consolidates the received general model parameters that result from fusions by the other nodes of the N nodes than the $i^{th}$ node and that are sent by the other nodes and the $i^{th}$ general model parameter block obtained by means of fusion by the $i^{th}$ node, so as to obtain a new general model parameter fused by the N nodes.

Further, after the $i^{th}$ node obtains the new general model parameter fused by the N nodes, the $i^{th}$ node may return to step 202 to perform the iterative computation based on the data subset and the new general model parameter fused by the N nodes until a final model parameter is outputted.

According to the model parameter fusion method provided in this embodiment of the present invention, a fusion controller determines N nodes that meet a fusion condition; an $i^{th}$ node divides a model parameter of the $i^{th}$ node into N blocks, receives $i^{th}$ model parameter blocks respectively sent by other nodes of the N nodes than the $i^{th}$ node, then fuses an $i^{th}$ model parameter block of the $i^{th}$ node and the $i^{th}$ model parameter blocks respectively sent by the other nodes, so as to obtain the $i^{th}$ general model parameter block, and finally distributes the $i^{th}$ general model parameter block to the other nodes of the N nodes, where the $i^{th}$ node is any node of the N nodes that participate in a fusion. Therefore, computing resources can be dynamically adjusted, capabilities of dynamically deleting and adding a node are provided, and in addition, each node that participates in the fusion may simultaneously send a model parameter and receive a model parameter, which improves network resource utilization and system stability.

Embodiment 3

Figure 5:
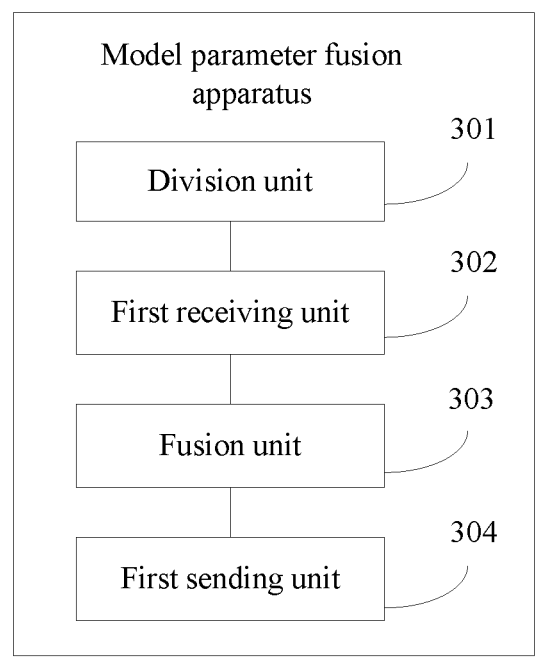
FIG. 5 is a schematic structural diagram of a first model parameter apparatus according to an embodiment of the present invention.

FIG. 5 is a schematic structural diagram of a model parameter fusion apparatus according to an embodiment of the present invention, applied to a machine learning system, where the machine learning system includes M nodes. As shown in FIG. 5, the apparatus includes:

a division unit 301, configured to divide a model parameter of the model parameter fusion apparatus into N blocks, where N is a quantity of model parameter fusion apparatuses that participate in a fusion and that are of the M model parameter fusion apparatuses, an $i^{th}$ block of the N blocks resulting from the division of the model parameter is an $i^{th}$ model parameter block, and $1 \leq i \leq N \leq M$, where the $i^{th}$ model parameter block herein refers to a model parameter block that corresponds to an $i^{th}$ model parameter fusion apparatus and that is of the N model parameter blocks resulting from the division, and the $i^{th}$ model parameter fusion apparatus is responsible for performing a subsequent fusion operation on the $i^{th}$ model parameter block;

a first receiving unit 302, configured to receive $i^{th}$ model parameter blocks respectively sent by other model parameter fusion apparatuses of the N model parameter fusion apparatuses than the model parameter fusion apparatus;

a fusion unit 303, configured to fuse the $i^{th}$ model parameter block of the model parameter fusion apparatus and the $i^{th}$ model parameter blocks respectively sent by the other model parameter fusion apparatuses, so as to obtain the $i^{th}$ general model parameter block; and a first sending unit 304, configured to distribute the $i^{th}$ general model parameter block to the other model parameter fusion apparatuses of the N model parameter fusion apparatuses than the model parameter fusion apparatus.

When the $i^{th}$ model parameter blocks respectively sent by the other model parameter fusion apparatuses of the N model parameter fusion apparatuses than the model parameter fusion apparatus are received, and the $i^{th}$ general model parameter block is distributed to the other model parameter fusion apparatuses of the N model parameter fusion apparatuses, a full-duplex data transmission manner may be used, that is, when data is sent to another model parameter fusion apparatus, data sent by the another model parameter fusion apparatus may be simultaneously received; for example, a full-duplex network interface card is used. This is not limited in this embodiment of the present invention.

In addition, the N model parameter fusion apparatuses that participate in the fusion are determined from the M model parameter fusion apparatuses according to a preset fusion condition. The fusion condition may be that a quantity of nodes that have completed an iterative computation reaches a preset value, and during each fusion, the preset value may be a constant, or may be variable; or the fusion condition is that a quantity of times that a specified computation is completed reaches a preset quantity of times, and during each fusion, the preset quantity of times may be a constant, or may be variable; or the fusion condition is that an iterative computation has been performed for a preset duration, and during each fusion, the preset duration may be a constant, or may be variable. Certainly, the fusion condition may also be another condition, or the like. This is not limited in detail in this embodiment of the present invention.

Figure 6:
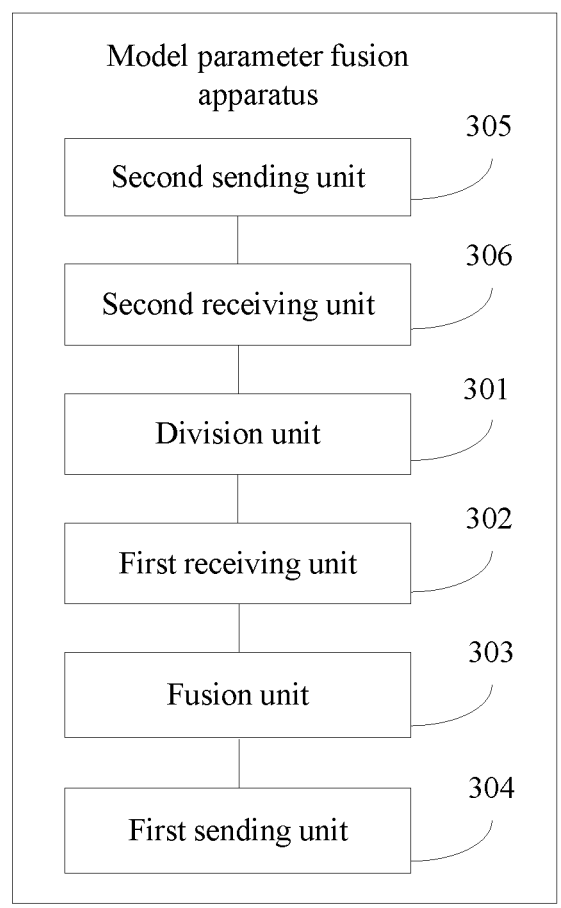
FIG. 6 is a schematic structural diagram of a second model parameter apparatus according to an embodiment of the present invention.

Optionally, as shown in FIG. 6, the apparatus further includes:

a second sending unit 305, configured to: after a specified iteration task is completed, send an address and fusion state information of the model parameter fusion apparatus to a fusion controller, where the fusion state information includes a computation state and/or a quantity of iterations of the model parameter fusion apparatus; and a second receiving unit 306, configured to receive fusion indication information, where the fusion indication information is sent by the fusion controller after the N model parameter fusion apparatuses that meet a fusion condition are determined according to received addresses and fusion state information of K model parameter fusion apparatuses, the fusion indication information includes addresses and/or numbers of the N model parameter fusion apparatuses, the K model parameter fusion apparatuses are model parameter fusion apparatuses that have completed the specified iteration task and that are of the M model parameter fusion apparatuses, and $1 \leq K \leq M$.

Figure 7:
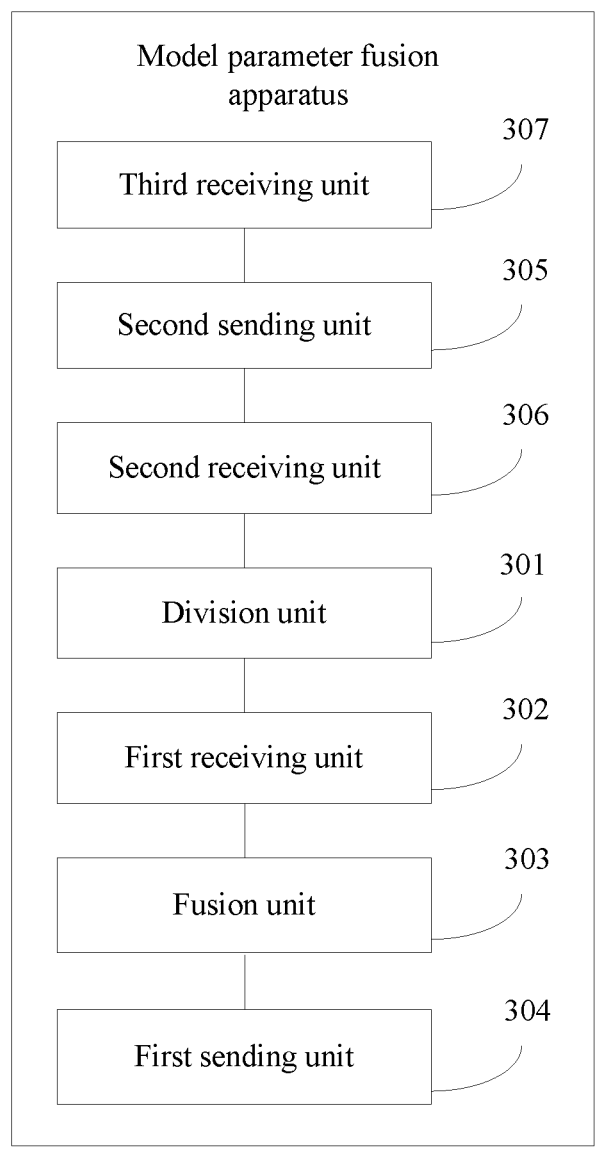
FIG. 7 is a schematic structural diagram of a third model parameter apparatus according to an embodiment of the present invention.

Optionally, as shown in FIG. 7, the fusion controller is a first model parameter fusion apparatus, first model parameter fusion apparatus is alternately any model parameter fusion apparatus of T model parameter fusion apparatuses of the M nodes, and $T \leq M$; and the apparatus further includes:

a third receiving unit 307, configured to receive an address of the first model parameter fusion apparatus sent by the first model parameter fusion apparatus; and correspondingly, the second sending unit 305 is specifically configured to:

send the address and the fusion state information of the model parameter fusion apparatus to the first model parameter fusion apparatus according to the address of the first model parameter fusion apparatus.

It should be noted that when the model parameter fusion apparatus is a first model parameter fusion apparatus, the first model parameter fusion apparatus may be any model parameter fusion apparatus of the K model parameter fusion apparatuses of the M model parameter fusion apparatuses, and the K model parameter fusion apparatuses of the M model parameter fusion apparatuses may alternately serve as the first model parameter fusion apparatus; that is, the first model parameter fusion apparatus may specify any model parameter fusion apparatus of the K model parameter fusion apparatuses of the M model parameter fusion apparatuses to serve as next model parameter fusion apparatus, and the next model parameter fusion apparatus may specify an after-next model parameter fusion apparatus, and so on.

Figure 8:
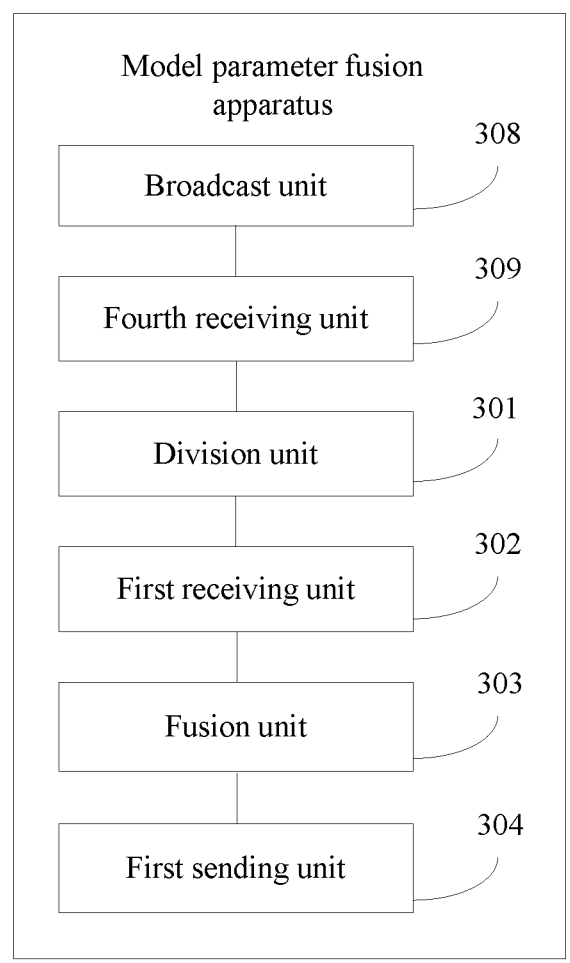
FIG. 8 is a schematic structural diagram of a fourth model parameter apparatus according to an embodiment of the present invention.

Optionally, as shown in FIG. 8, the apparatus further includes:

a broadcast unit 308, configured to broadcast the address and the fusion state information of the model parameter fusion apparatus to each model parameter fusion apparatus of the M model parameter fusion apparatuses, which means that each model parameter fusion apparatus of the M model parameter fusion apparatuses may simultaneously record an address and fusion state information, which means that each model parameter fusion apparatus of the M model parameter fusion apparatuses may simultaneously record an address and fusion state information of a model parameter fusion apparatus; and a fourth receiving unit 309, configured to receive fusion indication information sent by a second model parameter fusion apparatus, where the second model parameter fusion apparatus is any model parameter fusion apparatus of K model parameter fusion apparatuses of the M model parameter fusion apparatuses, the fusion indication information is sent by the second model parameter fusion apparatus after the N model parameter fusion apparatuses that meet a fusion condition are determined according to received addresses and fusion state information of the K model parameter fusion apparatuses, the fusion indication information includes addresses and/or numbers of the N nodes, the K model parameter fusion apparatuses are model parameter fusion apparatuses that have completed a specified iteration task and that are of the M model parameter fusion apparatuses, and $1 \leq K \leq M$.

That is, any model parameter fusion apparatus of nodes that simultaneously record addresses and fusion state information of the M model parameter fusion apparatuses is used as a second model parameter fusion apparatus, and the second model parameter fusion apparatus serves as next model parameter fusion apparatus.

Figure 8A:
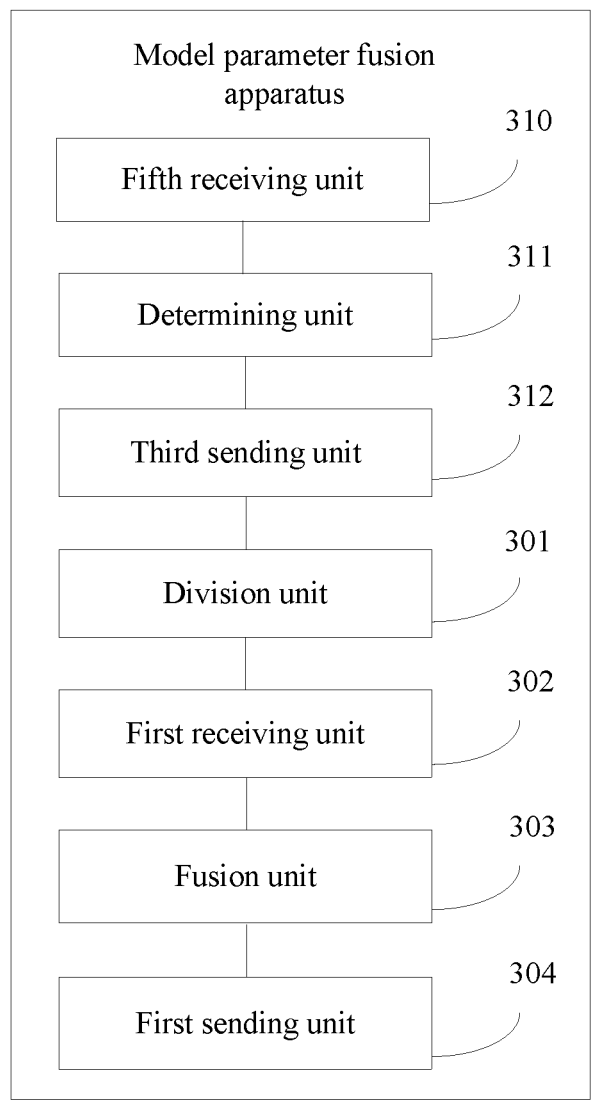
FIG. 8*a* is a schematic structural diagram of a fifth model parameter apparatus according to an embodiment of the present invention.

Optionally, as shown in FIG. 8a, the apparatus further includes:

a fifth receiving unit 310, configured to receive addresses and fusion state information of K model parameter fusion apparatuses, where the fusion state information includes a computation state and/or a quantity of iterations of a model parameter fusion apparatus, the K model parameter fusion apparatuses are model parameter fusion apparatuses that have completed a specified iteration task and that are of the M model parameter fusion apparatuses, and $1 \leq K \leq M$;

a determining unit 311, configured to determine, according to the received addresses and fusion state information of the K model parameter fusion apparatuses, the N model parameter fusion apparatuses that meet a fusion condition; and a third sending unit 312, configured to send fusion indication information to the other model parameter fusion apparatuses of the N model parameter fusion apparatuses than the model parameter fusion apparatus, so that the other model parameter fusion apparatuses of the N model parameter fusion apparatuses than the model parameter fusion apparatus perform a parameter fusion according to the fusion indication information, where the fusion indication information includes addresses and/or numbers of the N nodes.

Figure 8B:
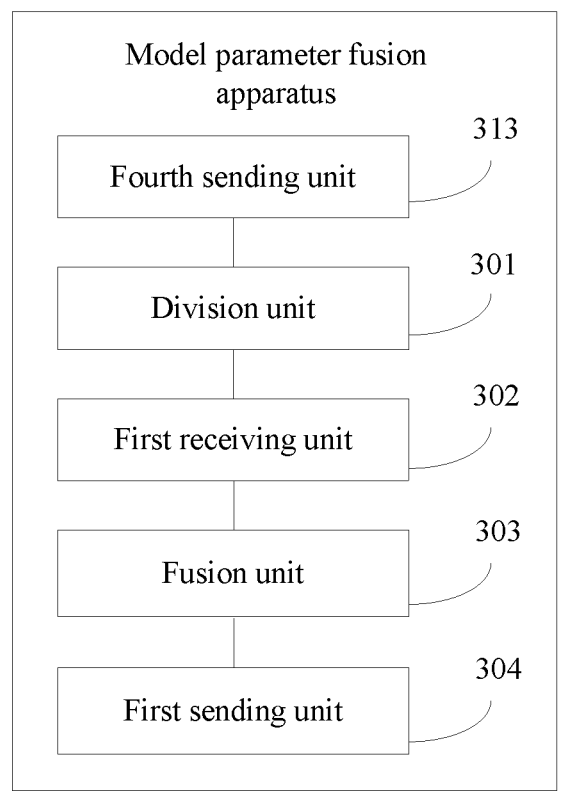
FIG. 8*b* is a schematic structural diagram of a sixth model parameter apparatus according to an embodiment of the present invention.

Optionally, as shown in FIG. 8b, the apparatus further includes:

a fourth sending unit 313, configured to send an address of the model parameter fusion apparatus to other model parameter fusion apparatuses of the M model parameter fusion apparatuses than the model parameter fusion apparatus, so that the other model parameter fusion apparatuses of the M model parameter fusion apparatuses than the model parameter fusion apparatus send, according to the received address, addresses and fusion state information of the other model parameter fusion apparatuses.

Optionally, the apparatus further includes:

a fifth sending unit, configured to send a $j^{th}$ model parameter block of the $i^{th}$ model parameter fusion apparatus to a $j^{th}$ model parameter fusion apparatus of the N model parameter fusion apparatuses, where $1 \leq j \leq N$ and $j \neq i$.

That is, other model parameter blocks of the divided model parameter than the $i^{th}$ block are sent to the other model parameter fusion apparatuses of the N model parameter fusion apparatuses; $j^{th}$ blocks having a same number are sent to the $j^{th}$ model parameter fusion apparatus, and the $j^{th}$ model parameter fusion apparatus is responsible for fusing the $j^{th}$ model parameter blocks.

Figure 8C:
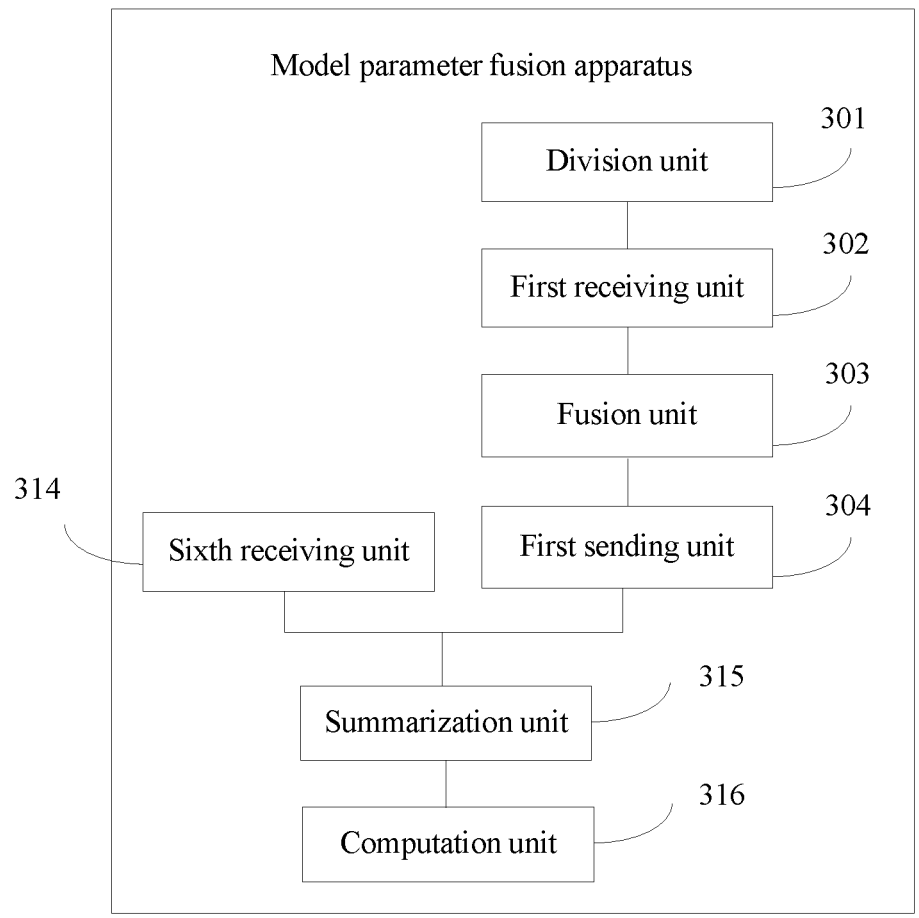
FIG. 8*c* is a schematic structural diagram of a seventh model parameter apparatus according to an embodiment of the present invention.

Optionally, as shown in FIG. 8c, the apparatus further includes:

a sixth receiving unit 314, configured to receive the $j^{th}$ general model parameter block that results from a fusion by the $j^{th}$ model parameter fusion apparatus and that is sent by the $j^{th}$ model parameter fusion apparatus;

a consolidation unit 315, configured to receive the $j^{th}$ general model parameter block that results from a fusion by the $j^{th}$ model parameter fusion apparatus and that is sent by the $j^{th}$ model parameter fusion apparatus; and a computation unit 316, configured to perform an iterative computation according to the new general model parameter.

According to the model parameter fusion apparatus provided in this embodiment of the present invention, N model parameter fusion apparatuses that meet a fusion condition are determined; a model parameter of an $i^{th}$ model parameter fusion apparatus is divided into N blocks; $i^{th}$ model parameter blocks respectively sent by other model parameter fusion apparatuses of the N model parameter fusion apparatuses than the $i^{th}$ model parameter fusion apparatus are received; then, an $i^{th}$ model parameter block of the $i^{th}$ model parameter fusion apparatus and the $i^{th}$ model parameter blocks respectively sent by the other model parameter fusion apparatuses are fused, so as to obtain the $i^{th}$ general model parameter block; and finally, the $i^{th}$ general model parameter block is distributed to the other model parameter fusion apparatuses of the N model parameter fusion apparatuses. Therefore, computing resources can be dynamically adjusted, and in addition, network resource utilization and system stability are improved.

Embodiment 4

Figure 9:
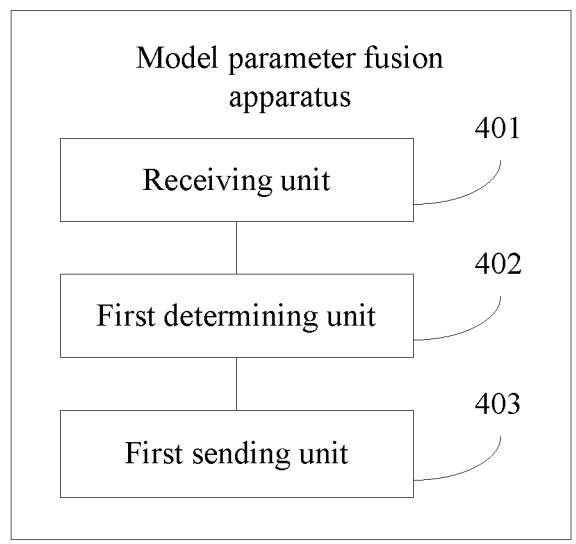
FIG. 9 is a schematic structural diagram of an eighth model parameter apparatus according to an embodiment of the present invention.

FIG. 9 is a schematic structural diagram of a model parameter fusion apparatus according to an embodiment of the present invention, applied to a machine learning system, where the machine learning system includes M nodes. As shown in FIG. 9, the apparatus includes:

a receiving unit 401, configured to receive an address and fusion state information sent by a node that has completed a specified computation and that is of the M nodes, where the fusion state information includes a computation state and/or a quantity of iterations of the node;

a first determining unit 402, configured to determine, according to the received address and fusion state information, N nodes that meet a fusion condition, where quantities of N nodes that are determined at different times and that meet the fusion condition are the same or different; and a first sending unit 403, configured to: send fusion indication information to each node of the N nodes, where the fusion indication information includes addresses and/or numbers of the N nodes, so that each node of the N nodes divides a model parameter of the node into N blocks; and send an $i^{th}$ model parameter block resulting from the division of the model parameter of the node to an $i^{th}$ node, where 1≤i≤N, each node of the N nodes fuses model parameters received by the node, and each node of the N nodes distributes a model parameter resulting from the fusion to other nodes of the N nodes than the node.

Optionally, the fusion condition is that a quantity of nodes that have completed the specified computation reaches a preset value, or that a quantity of times that the specified computation is completed reaches a preset quantity of times, or that a preset duration has expired. During each fusion, the preset value, the preset quantity of times, and the preset duration may be constants, or may be variable. Certainly, in an actual application, the fusion condition may further be another condition, or the like. This is not limited in this embodiment of the present invention.

Optionally, the first determining unit is further specifically configured to:

determine nodes that have completed a fusion, and N nodes of nodes that have not completed the fusion and have completed the specified computation.

Figure 10:
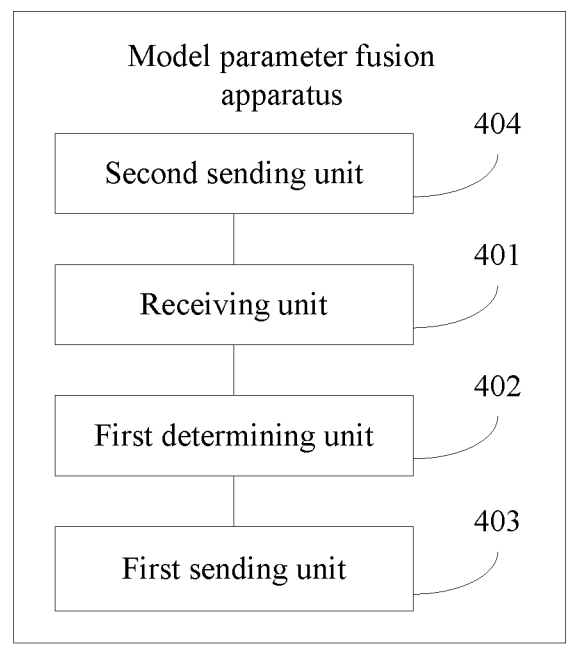
FIG. 10 is a schematic structural diagram of a ninth model parameter apparatus according to an embodiment of the present invention.

Optionally, as shown in FIG. 10, the model parameter fusion apparatus is a first node, the first node is any node of the M nodes, and the apparatus further includes:

a second sending unit 404, configured to send an address of the first node to other nodes of the M nodes than the first node.

Figure 11:
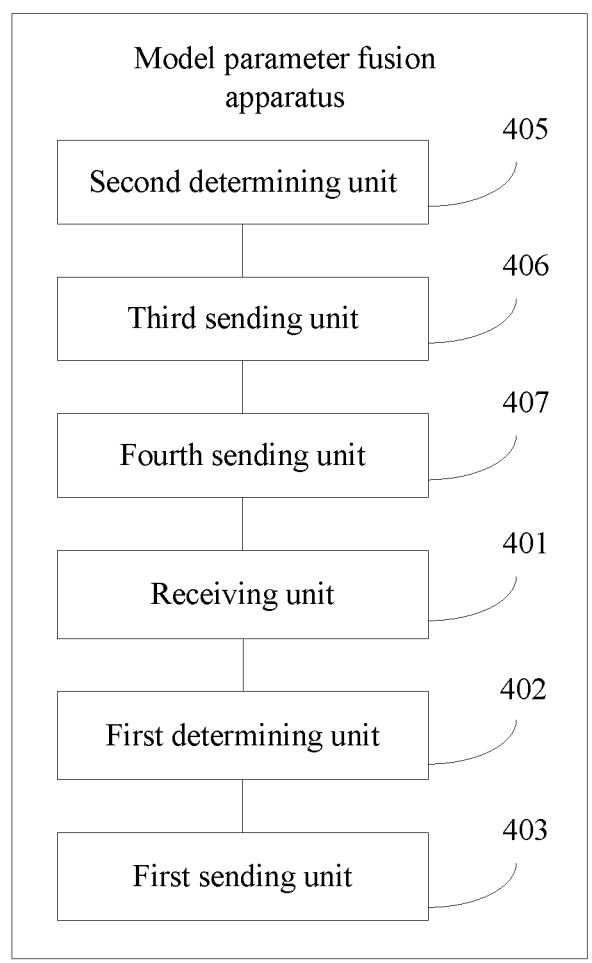
FIG. 11 is a schematic structural diagram of a tenth model parameter apparatus according to an embodiment of the present invention.

Optionally, as shown in FIG. 11, the apparatus further includes:

a second determining unit 405, configured to: after a preset condition is met, determine a second node as a model parameter fusion apparatus in a second time period, where the second node is any node of K nodes of the M nodes, and K≤M;

a third sending unit 406, configured to send node fusion information to the second node, where the node fusion information includes addresses and fusion state information of the M nodes; and a fourth sending unit 407, configured to send an address of the second node to other nodes than the second node.

The preset condition may be that a specific time passes, or a specific quantity of fusions passes, or a specific quantity of iterations passes, or the like. This is not limited in the present invention.

It should be noted that the specific time, the specific quantity of fusions, and the specific quantity of iterations may be set in advance; and the specific time, the specific quantity of fusions, and the specific quantity of iterations may be constant, or may be variable.

Optionally, the apparatus further includes:

a third determining unit, configured to: if the second node is faulty in the second time period, determine a third node as the model parameter fusion apparatus in the second time period, where the third node is any node of the K nodes of the M nodes.

That is, when the second node is faulty, the second determining unit redetermines a node of the M nodes as the model parameter fusion apparatus in the second time period; in this case, the node may be referred to as a third node.

Optionally, the model parameter fusion apparatus is at least one node of the M nodes; and that the at least one node receives an address and fusion state information sent by each node after the node completes the specified computation, determines the N nodes that meet the fusion condition, and sends the fusion indication information to each node of the N nodes is: determining, by any node of the at least one node according to the received address and fusion state information, the N nodes that meet the fusion condition, and sending the fusion indication information to each node of the N nodes.

That is, when one or more nodes of the M nodes all record node fusion information of the M nodes, after completing the fusion, each node sends an address and fusion state information of the node, for example, a computation state and/or a quantity of iterations of the node, to at least one node that records the node fusion information and that is of the M nodes. Any node of the at least one node determines, according to the received address and fusion state information, the N nodes that meet the fusion condition, and sends the fusion indication information to each node of the N nodes.

According to the model parameter fusion apparatus provided in this embodiment of the present invention, N nodes that meet a fusion condition are determined based on an address and fusion state information sent by a node that has completed a specified computation and that is of M nodes, and fusion indication information is sent to each node of the N nodes, so that each node of the N nodes divides a model parameter of the node into N blocks, and sends an model parameter block of the model parameter to an node; each node of the N nodes fuses model parameters received by the node, and each node of the N nodes distributes a model parameter resulting from the fusion to other nodes of the N nodes. Therefore, computing resources can be dynamically adjusted, capabilities of dynamically deleting and adding a node are provided, and in addition, each node that participates in the fusion may simultaneously send a model parameter and receive a model parameter, which improves network resource utilization and system stability.

Embodiment 5

Figure 12:
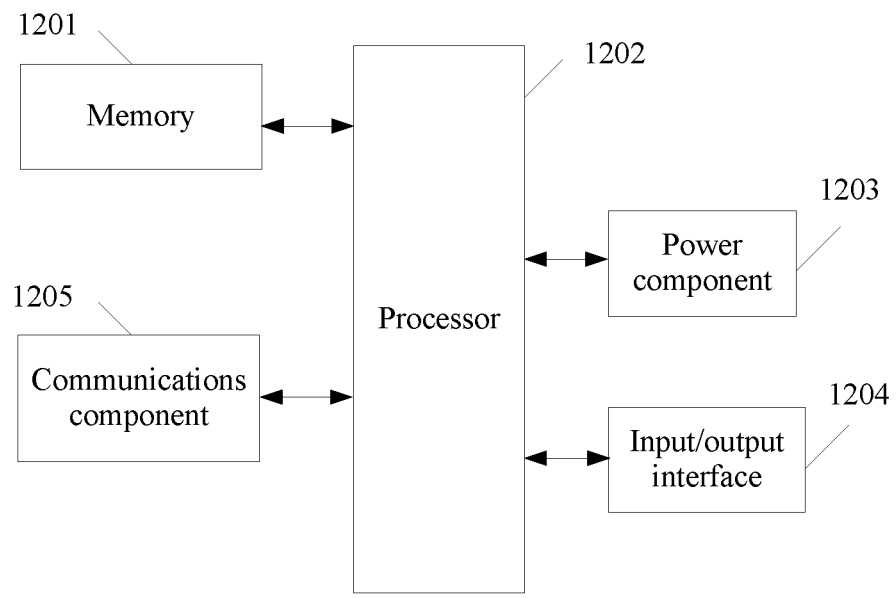
FIG. 12 is a schematic structural diagram of a node according to an embodiment of the present invention.

FIG. 12 is a node according to an embodiment of the present invention. The node includes a memory 1201, a processor 1202, a power component 1203, an input/output interface 1204, a communications component 1205, and the like. The processor 1202 is configured to execute the model parameter fusion method described in Embodiment 2.

A person of ordinary skill in the art may understand that a structure shown in FIG. 12 is merely exemplary, which does not constitute a limitation on a structure of the node. For example, the node may further include more or fewer components than those shown in FIG. 12, or may have a different configuration from that shown in FIG. 12.

The following describes each component of the node in detail.

The memory 1201 may be configured to store data, a software program, and a module, and mainly includes a program storage area and a data storage area. The program storage area may store an operating system, an application program required by at least one function, and the like; the data storage area may store data created according to use of a model parameter fusion apparatus, and the like. In addition, the memory may include a high-speed random access memory, and may further include a non-volatile memory, for example, at least one disk storage device, a flash memory device, or another volatile solid-state storage device.

The processor 1202 is a control center of the node and is connected to each part of the entire node by using various interfaces and lines, and performs, by running or executing the software program and/or the module that are/is stored in the memory 1201 and invoking the data stored in the memory 1201, various functions of the node and data processing, so as to perform overall monitoring on the node. Optionally, the processor 1202 may include one or more processing units. Preferably, an application processor and a modem processor may be integrated into the processor 502, where the application processor mainly processes an operating system, a user interface, an application program, and the like; and the modem processor mainly processes wireless communication. It may be understood that, alternatively, the foregoing modem processor may not be integrated into the processor 1202.

The power component 1203 is configured to supply power to each component of the node. The power component 503 may include a power management system, one or more power supplies, and another component related to power generation, management, and distribution of the node.

The input/output interface 1204 provides an interface between the processor 1202 and a peripheral interface module, for example, the peripheral interface module may be a keyboard, or a mouse cursor.

The communications component 1205 is configured to facilitate communication between the node and another device in a wired or wireless manner. The node may connect to a communication-standard-based wireless network, such as WiFi, 2G or 3G, or a combination thereof.

Although not shown, the node may further include an audio component, a multimedia component, and the like, which is not described in this embodiment of the present invention.

According to the node provided in this embodiment of the present invention, each node of N nodes that participate in a fusion divides a model parameter of the node into N blocks, and sends an $i^{th}$ model parameter block of the model parameter to an $i^{th}$ node. Each node of the N nodes fuses model parameters received by the node, and distributes a model parameter resulting from the fusion to other nodes of the N nodes. Therefore, capabilities of dynamically deleting and adding a node are provided, and in addition, each node that participates in the fusion may simultaneously send a model parameter and receive a model parameter, which improves network resource utilization and system stability.

Embodiment 6

Figure 13:
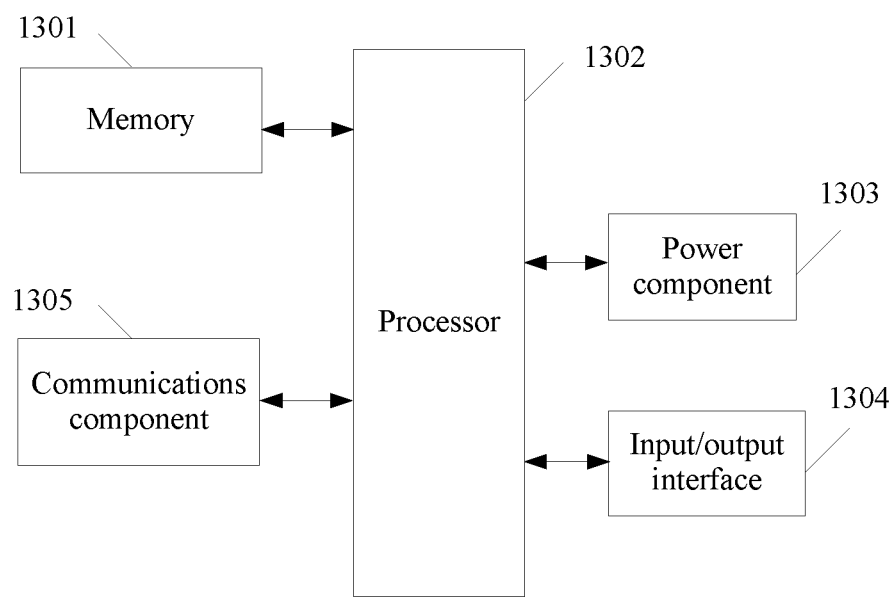
FIG. 13 is a schematic structural diagram of a fusion controller according to an embodiment of the present invention.

FIG. 13 is a fusion controller according to an embodiment of the present invention. The fusion controller includes a memory 1301, a processor 1302, a power component 1303, an input/output interface 1304, a communications component 1305, and the like. The processor 1302 is configured to execute the model parameter fusion method described in Embodiment 2.

A person of ordinary skill in the art may understand that a structure shown in FIG. 13 is merely exemplary, which does not constitute a limitation on a structure of the fusion controller. For example, the fusion controller may further include more or fewer components than those shown in FIG. 13, or may have a different configuration from that shown in FIG. 13.

The following describes each component of the fusion controller in detail.

The memory 1301 may be configured to store data, a software program, and a module, and mainly includes a program storage area and a data storage area. The program storage area may store an operating system, an application program required by at least one function, and the like; the data storage area may store data created according to use of a model parameter fusion apparatus, and the like. In addition, the memory may include a high-speed random access memory, and may further include a non-volatile memory, for example, at least one disk storage device, a flash memory device, or another volatile solid-state storage device.

The processor 1302 is a control center of the fusion controller and is connected to each part of the entire fusion controller by using various interfaces and lines, and performs, by running or executing the software program and/or the module that are/is stored in the memory 1301 and invoking the data stored in the memory 1301, various functions of the fusion controller and data processing, so as to perform overall monitoring on the fusion controller. Optionally, the processor 1302 may include one or more processing units. Preferably, an application processor and a modem processor may be integrated into the processor 502, where the application processor mainly processes an operating system, a user interface, an application program, and the like; and the modem processor mainly processes wireless communication. It may be understood that, alternatively, the foregoing modem processor may not be integrated into the processor 1302.

The power component 1303 is configured to supply power to each component of the fusion controller. The power component 503 may include a power management system, one or more power supplies, and another component related to power generation, management, and distribution of the fusion controller.

The input/output interface 1304 provides an interface between the processor 1302 and a peripheral interface module, for example, the peripheral interface module may be a keyboard, or a mouse cursor.

The communications component 1305 is configured to facilitate communication between the fusion controller and another device in a wired or wireless manner. The fusion controller may connect to a communication-standard-based wireless network, such as WiFi, 2G or 3G, or a combination thereof.

Although not shown, the fusion controller may further include an audio component, a multimedia component, and the like, which is not described in this embodiment of the present invention.

According to the fusion controller provided in this embodiment of the present invention, N nodes that meet a fusion condition are determined based on an address and fusion state information sent by a node that has completed a specified computation and that is of M nodes, and fusion indication information is sent to each node of the N nodes, so that each node of the N nodes divides a model parameter of the node into N blocks, and sends an $i^{th}$ model parameter block of the model parameter to an $i^{th}$ node; each node of the N nodes fuses model parameters received by the node, and each node of the N nodes distributes a model parameter resulting from the fusion to other nodes of the N nodes. Therefore, computing resources can be dynamically adjusted, and in addition, network resource utilization and system stability are improved.

Embodiment 7

An embodiment of the present invention provides a machine learning system, where the machine learning system includes the node described in Embodiment 5, and the fusion controller described in Embodiment 6.

Optionally, the fusion controller is provided separate from the node, or is configured on the node.

According to the machine learning system provided in this embodiment of the present invention, a fusion controller determines, based on an address and fusion state information sent by a node that has completed a specified computation and that is of M nodes, N nodes that meet a fusion condition, and sends fusion indication information to each node of the N nodes, so that each node of the N nodes that participate in a fusion divides a model parameter of the node into N blocks, and sends an $i^{th}$ model parameter block of the model parameter to an $i^{th}$ node; each node of the N nodes fuses model parameters received by the node, and each node of the N nodes distributes a model parameter resulting from the fusion to other nodes of the N nodes. Therefore, computing resources can be dynamically adjusted, capabilities of dynamically deleting and adding a node are provided, and in addition, each node that participates in the fusion may simultaneously send a model parameter and receive a model parameter, which improves network resource utilization and system stability.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for fusing model parameters by a machine learning system including M nodes, the method comprising:
    receiving, by an $i^{th}$ node, fusion indication information from a fusion controller;
    dividing, by the $i^{th}$ node, a model parameter of the $i^{th}$ node into N blocks according to the fusion indication information,
        wherein the $i^{th}$ node is one of N nodes that participate in a fusion and that are of the M nodes,
        wherein $1 \le i \le N \le M$, and
        wherein an $i^{th}$ block of the N blocks resulting from the division of the model parameter is an $i^{th}$ model parameter block of the $i^{th}$ node;
    receiving, by the $i^{th}$ node, $i^{th}$ model parameter blocks respectively sent by nodes of the N nodes other than the $i^{th}$ node;
    fusing, by the $i^{th}$ node, the $i^{th}$ model parameter block of the $i^{th}$ node and the $i^{th}$ model parameter blocks respectively sent by the other nodes, so as to obtain an $i^{th}$ general model parameter block; and
    distributing, by the $i^{th}$ node, the $i^{th}$ general model parameter block to the other nodes of the N nodes than the $i^{th}$ node.

2. The method according to claim 1, wherein the fusion indication information is received after the N nodes that meet a fusion condition, which are determined according to a received address and received fusion state information of a $k^{th}$ node,
    wherein the fusion indication information comprises addresses and/or numbers of the N nodes,
    wherein the $k^{th}$ node is a node that has completed a specified iteration task and that is of the M nodes,
    wherein $1 \le k \le M$, and
    wherein the fusion state information comprises a computation state and/or a quantity of iterations of the node.

3. The method according to claim 2, further comprising:
    upon the fusion controller being a first node among T nodes of the M nodes, and $T \le M$, receiving, by the $k^{th}$ node, an address of the first node sent by the first node and sending, by the $k^{th}$ node according to the address of the first node, the address and the fusion state information of the $k^{th}$ node to the first node.

4. The method according to claim 2, further comprising:
    before dividing the model parameter of the $i^{th}$ node into N blocks, broadcasting, by a $k^{th}$ node, an address and fusion state information of the $k^{th}$ node to each node of the M nodes; and
    receiving, by the $k^{th}$ node, fusion indication information sent by a second node,
        wherein the second node is one of the M nodes,
        wherein the fusion indication information is sent by the second node after the N nodes that meet a fusion condition are determined according to the received address and fusion state information of the k$^{th}$ node, and wherein the fusion indication information comprises addresses and/or numbers of the N nodes.

5. The method according to claim 1, further comprising:
sending, by the ith node, a j$^{th}$ model parameter block of the i$^{th}$ node to a j$^{th}$ node of the N nodes, wherein 1≤j≤N and j≠i.

6. The method according to claim 5, wherein the method further comprises:
receiving, by the i$^{th}$ node, the j$^{th}$ model parameter block that results from a fusion by the j$^{th}$ node and that is sent by the j$^{th}$ node;
consolidating, by the i$^{th}$ node, associated parts of all received general model parameters that result from fusions by the other nodes of the N nodes and that are received from the other nodes, so as to generate a new general model parameter of the i$^{th}$ node; and
performing, by the i$^{th}$ node, an iterative computation according to the new general model parameter.

7. A model parameter fusion apparatus, applied to a machine learning system, wherein the machine learning system comprises M model parameter fusion apparatuses and the apparatus comprises:
at least one processor; and
a non-transitory computer-readable storage medium coupled to the at least one processor and storing programming instructions for execution by the at least one processor, wherein the programming instructions instruct the at least one processor to:
receiving fusion indication information from a fusion controller;
divide a model parameter of the model parameter fusion apparatus into N blocks according to the fusion indication information,
wherein N is a quantity of model parameter fusion apparatuses that participate in a fusion and that are of the M model parameter fusion apparatuses, and
wherein an i$^{th}$ block of the N blocks resulting from the division of the model parameter is an i$^{th}$ model parameter block, and 1≤i≤N≤M;
receive i$^{th}$ model parameter blocks respectively sent by model parameter fusion apparatuses of the N model parameter fusion apparatuses other than the model parameter fusion apparatus;
fuse the i$^{th}$ model parameter block of the model parameter fusion apparatus and the i$^{th}$ model parameter blocks respectively sent by the other model parameter fusion apparatuses, so as to obtain an i$^{th}$ general model parameter block; and
distribute the i$^{th}$ general model parameter block to the other model parameter fusion apparatuses of the N model parameter fusion apparatuses than the model parameter fusion apparatus.

8. The apparatus according to claim 7, wherein after a specified iteration task is completed, the programming instructions further instruct the at least one processor to:
send an address and fusion state information of the model parameter fusion apparatus to a fusion controller,
wherein the fusion state information comprises a computation state and/or a quantity of iterations of the model parameter fusion apparatus,
wherein the fusion indication information is sent by the fusion controller after the N model parameter fusion apparatuses that meet a fusion condition are determined according to received addresses and fusion state information of K model parameter fusion apparatuses,
wherein the fusion indication information comprises addresses and/or numbers of the N model parameter fusion apparatuses, and
wherein the K model parameter fusion apparatuses are model parameter fusion apparatuses that have completed the specified iteration task and that are of the M model parameter fusion apparatuses, and 1≤K≤M.

9. The apparatus according to claim 8, wherein the fusion controller is a first model parameter fusion apparatus, the first model parameter fusion apparatus is one among T model parameter fusion apparatuses of the M model parameter fusion apparatuses, and T≤M and the programming instructions further instruct the at least one processor to:
receive an address of the first model parameter fusion apparatus sent by the first model parameter fusion apparatus; and
send the address and the fusion state information of the model parameter fusion apparatus to the first model parameter fusion apparatus according to the address of the first model parameter fusion apparatus.

10. The apparatus according to claim 7, the programming instructions further instruct the at least one processor to:
broadcast the address and the fusion state information of the model parameter fusion apparatus to each model parameter fusion apparatus of the M model parameter fusion apparatuses; and
receive fusion indication information sent by a second model parameter fusion apparatus,
wherein the second model parameter fusion apparatus is one of K model parameter fusion apparatuses of the M model parameter fusion apparatuses,
wherein the fusion indication information is sent by the second model parameter fusion apparatus after the N model parameter fusion apparatuses that meet a fusion condition are determined according to received addresses and fusion state information of the K model parameter fusion apparatuses,
wherein the fusion indication information comprises addresses and/or numbers of the N model parameter fusion apparatuses, and
wherein the K model parameter fusion apparatuses are model parameter fusion apparatuses that have completed a specified iteration task and that are of the M model parameter fusion apparatuses, and 1≤K≤M.

11. The apparatus according to claim 7, the programming instructions further instruct the at least one processor to:
receive addresses and fusion state information of K model parameter fusion apparatuses,
wherein the fusion state information comprises a computation state and/or a quantity of iterations of a model parameter fusion apparatus,
wherein the K model parameter fusion apparatuses are model parameter fusion apparatuses that have completed a specified iteration task and that are of the M model parameter fusion apparatuses, and 1≤K≤M;
determine, according to the received addresses and fusion state information of the K model parameter fusion apparatuses, the N model parameter fusion apparatuses that meet a fusion condition; and
send fusion indication information to the other model parameter fusion apparatuses of the N model parameter fusion apparatuses than the model parameter fusion apparatus, so that the other model parameter fusion apparatuses of the N model parameter fusion apparatuses perform a parameter fusion according to the fusion indication information, wherein the fusion indication information comprises addresses and/or numbers of the N model parameter fusion apparatuses.

12. The apparatus according to claim 11, the programming instructions further instruct the at least one processor to:

send an address of the model parameter fusion apparatus to other model parameter fusion apparatuses of the M model parameter fusion apparatuses than the model parameter fusion apparatus, so that the other model parameter fusion apparatuses of the M model parameter fusion apparatuses send, according to the received address, addresses and fusion state information of the other model parameter fusion apparatuses.

13. The apparatus according to claim 7, the programming instructions further instruct the at least one processor to:

send a $j^{th}$ model parameter block of the model parameter fusion apparatus to a $j^{th}$ model parameter fusion apparatus of the N model parameter fusion apparatuses, wherein $1 \leq j \leq N$ and $j \neq i$.

14. The apparatus according to claim 13, the programming instructions further instruct the at least one processor to:

receive the $j^{th}$ model parameter block that results from a fusion by the $j^{th}$ model parameter fusion apparatus and that is sent by the $j^{th}$ model parameter fusion apparatus;

consolidate general model parameters sent by the other model parameter fusion apparatuses, so as to generate a new general model parameter; and perform an iterative computation according to the new general model parameter.

15. A node comprising a processor and a memory, the memory storing executable code and data, the processor configured to execute the code and thereby provide the model parameter fusion method according to claim 1.

* * * * *